(12) United States Patent
Momose

(10) Patent No.: US 10,436,620 B2
(45) Date of Patent: Oct. 8, 2019

(54) EXCITATION CIRCUIT FOR ELECTROMAGNETIC FLOW METER, AND ELECTROMAGNETIC FLOW METER

(71) Applicant: AZBIL CORPORATION, Chiyoda-ku (JP)

(72) Inventor: Osamu Momose, Chiyoda-ku (JP)

(73) Assignee: AZBIL CORPORATION, Chiyoda-ku (JP)

( * ) Notice: Subject to any disclaimer, the term of this patent is extended or adjusted under 35 U.S.C. 154(b) by 84 days.

(21) Appl. No.: 15/806,984

(22) Filed: Nov. 8, 2017

(65) Prior Publication Data

US 2018/0128665 A1    May 10, 2018

(30) Foreign Application Priority Data

Nov. 9, 2016  (JP) .................. 2016-218711

(51) Int. Cl.
 *G01F 1/60* (2006.01)
 *G01F 1/58* (2006.01)
 *H02M 7/217* (2006.01)

(52) U.S. Cl.
 CPC .............. *G01F 1/60* (2013.01); *G01F 1/588* (2013.01); *H02M 7/217* (2013.01)

(58) Field of Classification Search
 None
 See application file for complete search history.

(56) References Cited

U.S. PATENT DOCUMENTS

| 4,144,751 A * | 3/1979 | Yokoyama | G01F 1/60 73/861.12 |
| 4,663,976 A * | 5/1987 | Suzuki | G01F 1/60 73/861.12 |
| 2006/0032316 A1* | 2/2006 | Ishikawa | G01F 1/60 73/861.11 |

FOREIGN PATENT DOCUMENTS

| JP | 53-020956 | 2/1978 |
| JP | 5-022949 | 1/1993 |
| JP | 2002-188945 | 7/2002 |

* cited by examiner

*Primary Examiner* — Harshad R Patel
(74) *Attorney, Agent, or Firm* — Oblon, McClelland, Maier & Neustadt, L.L.P.

(57) ABSTRACT

An excitation circuit includes a first switch connected between a third signal line and a first signal line supplied with a first DC voltage, a second switch connected between the third signal line and a second signal line supplied with a second DC voltage higher than the first DC voltage, third to sixth switches that reverses a polarity of a voltage on the third signal line to change a direction of an excitation current, a switching control circuit that switches the first switch at intervals shorter than intervals at which an excitation polarity is switched so that the excitation current has a first target value, and a switching control circuit that turns on the second switch when the absolute value of the excitation current is smaller than a second target value less than or equal to the first target value and that turns off the second switch when the excitation current is larger than the second target value.

12 Claims, 19 Drawing Sheets

Duty < 100%

VSW (PERIOD T1)

VSW (PERIOD T2)

Background Art

EXCITATION CIRCUIT FOR ELECTROMAGNETIC FLOW METER, AND ELECTROMAGNETIC FLOW METER

CROSS-REFERENCE TO RELATED APPLICATIONS

The present application is based on and claims priority to Japanese Application No. 2016-218711, filed Nov. 9, 2016, the entire contents of which are incorporated herein by reference.

BACKGROUND

1. Field

The present disclosure relates to an electromagnetic flow meter for measuring the flow rate of fluids for various process systems, and an excitation circuit for supplying an excitation current to an excitation coil for the electromagnetic flow meter.

2. Description of the Related Art

An electromagnetic flow meter typically includes an excitation coil for generating a magnetic field in a direction perpendicular to a direction of fluid flow within a measuring pipe, and a pair of electrodes disposed within the measuring pipe in a direction orthogonal to the magnetic field generated by the excitation coil. The electromagnetic flow meter measures the flow rate of a fluid flowing in the measuring pipe by detecting an electromotive force generated between the electrodes while alternating the polarity of an excitation current to be caused to flow through the excitation coil.

In an electromagnetic flow meter, accurate measurement of the flow rate of the fluid to be detected, that is, improvement of measurement stability, is important. There have been developed a variety of techniques for improve measurement stability of electromagnetic flow meters. Now, detailed descriptions will be provided.

One method is to switch the direction of the excitation current to be supplied to an excitation coil for short periods of time, that is, to increase the excitation frequency. This method can reduce 1/f noise included in a flow rate signal that is based on the electromotive force described above to enhance the signal-to-noise (S/N) ratio.

In an electromagnetic flow meter, typically, various noises such as electrochemical noise, fluid noise, and slurry noise are superimposed on an electromotive force detected by electrodes. These noises have a characteristic of having a higher level in a lower frequency band, called a 1/f characteristic. Hence, as the excitation frequency increases, the S/N ratio for the electromotive force becomes better, which results in high-accuracy calculation of the value for the flow rate.

When a rectangular-wave alternating-current (AC) voltage is applied to an excitation coil, the self-inductance of the excitation coil leads to a gradual rise of the excitation current. Thus, as the excitation frequency increases, the excitation current rises over a long period within a period during which the excitation coil is excited in one direction, which results in a reduced period over which a magnetic field with constant strength is generated. As a result, a flow rate signal based on the electromotive force detected by the electrodes has a short steady-state period of time during which the voltage remains constant, and thus it is difficult to stably sample the flow rate signal, which results in an increased measurement error in the value for the flow rate. It is therefore desirable that the excitation current rapidly rise even at high excitation frequencies.

For example, Japanese Unexamined Patent Application Publication No. 53-20956 (hereinafter referred to as "Patent Literature 1") discloses a technique for an excitation circuit for supplying an excitation current to an excitation coil. In the disclosed technique, to make the excitation current rise rapidly when the polarity of the excitation current (hereinafter referred to as the "excitation polarity") is switched at an increased excitation frequency, two power supplies having different voltages are prepared in advance such that the excitation coil is excited by the higher voltage at the rise time of the excitation current and is excited by the lower voltage during the steady state.

Another method for improving measurement stability of electromagnetic flow meters is to increase the excitation current to increase the level of a flow rate signal, that is, the signal level for an electromotive force generated between the electrodes.

However, in an electromagnetic flow meter of the related art (see, for example, Patent Literature 1), an excitation current is generated by a constant current circuit configured such that a power transistor is controlled by an operational amplifier with negative feedback. Thus, as the excitation current increases, the heat generation of the power transistor also increases, which requires a large radiator. It is therefore desirable to increase the excitation current with reduced heat generation.

For example, Japanese Unexamined Patent Application Publication No. 5-22949 (hereinafter referred to as "Patent Literature 2") and Japanese Unexamined Patent Application Publication No. 2002-188945 (hereinafter referred to as "Patent Literature 3") disclose techniques in which an excitation voltage that is made variable with a switching DC-DC converter is controlled in accordance with the residual voltage of a power transistor to reduce the heat generation of the power transistor. In excitation circuits disclosed in these patent literatures, a switching DC-DC converter performs constant current control of an excitation current, which eliminates the need for the constant current circuit disclosed in Patent Literature 1.

In the excitation circuit disclosed in Patent Literature 2, however, a direct current (DC) excitation voltage is generated by a DC conversion circuit including an inductor and a stabilization capacitor (output capacitor), and thus a delay in the response of the DC conversion circuit prolongs a stabilization period taken until the excitation current becomes stable, which makes it difficult to increase the excitation frequency. A reduction in the stabilization period may make the constant current control of the excitation current unstable.

In contrast, the excitation circuit disclosed in Patent Literature 3 is configured to directly pulse-drive the excitation coil without using the DC conversion circuit in the excitation circuit disclosed in Patent Literature 2, which can make the stabilization period taken until the excitation current becomes stable shorter than that in the excitation circuit disclosed in Patent Literature 2. As a result, the excitation frequency can be made higher.

In recent years, electromagnetic flow meters for the factory automation (FA) market have been receiving attention. Such electromagnetic flow meters are incorporated in FA devices for use and are thus required to be small in size.

Electromagnetic flow meters are typically classified roughly into two types: contact type and capacitive (non-contact) type. In the contact type, electrodes attached to a measuring pipe are brought into direct contact with the fluid to be measured to detect the electromotive force in the fluid. In the capacitive (non-contact) type, electrodes attached to a measuring pipe are not brought into contact with the fluid to be measured and the electromotive force in the fluid is detected using capacitance between the fluid and the electrodes. In particular, small capacitive-type electromagnetic flow meters having electrodes resistant to deterioration and designed for easy maintenance have been receiving attention recently.

In the related art, however, because of its design constraints, a small electromagnetic flow meter inevitably deteriorates measurement stability.

Specifically, when the excitation circuit disclosed in Patent Literature 1 described above is employed, to improve measurement stability, a higher excitation voltage is required for switching the excitation polarity to make the excitation current rise rapidly. An increase in excitation voltage leads to an increase in the power consumption of the power transistor in the constant current circuit and an increase in heat generation, which requires a radiator. However, it is difficult to keep space for the radiator to achieve a reduction in the size of an electromagnetic flow meter. To eliminate the need for a radiator, the excitation voltage and the excitation current need to be kept low and hence sufficient measurement stability is not expectable.

When the excitation circuit disclosed in Patent Literature 2 described above is employed, it is probable to increase the excitation voltage without using a radiator. However, as described above, it is difficult to increase the excitation frequency and hence sufficient measurement stability is not expectable.

When the excitation circuit disclosed in Patent Literature 3 described above is employed, since two high-side switches (transistors Q1 and Q2 in this patent literature) connected to an excitation coil have both a function of switching the polarity of the excitation current and a pulse driving function for generating an excitation voltage, it is necessary to perform a high-speed switching operation (e.g., several hundreds of kilohertz (kHz) to several megahertz (MHz)), which results in an increase in the complexity of a drive circuit for driving the high-side switches.

In the excitation circuit disclosed in Patent Literature 3 described above, furthermore, if the on-time Ton and off-time Toff of transistors constituting the high-side switches that perform a high-speed switching operation are delayed, the switching loss of the transistors increases, which results in an increase in heat generation during the high-speed switching operation. For example, as illustrated in FIG. 16, a triangular region 900A and a triangular region 900B, which are defined by a drain-source voltage Vds and a drain current Id of the transistors, respectively have an area Pon and an area Poff which correspond to the switching loss of the transistors. Accordingly, as the on-time Ton and the off-time Toff of the transistors increase, the lengths of the bases of the triangular regions 900A and 900B increase, which results in an increase in heat generation in the transistors.

In the excitation circuit disclosed in Patent Literature 3 described above, therefore, to make the on-time Ton and the off-time Toff of the high-side transistors shorter, a high-speed drive circuit for driving the transistors is necessary, which results in a further increase in the complexity of the circuit configuration.

In the excitation circuit disclosed in Patent Literature 3 described above, furthermore, as the power supply voltage increases to make the excitation current rise rapidly, the drain-source voltage Vds of the transistors constituting the high-side switches also increases. The heights of the triangular regions 900A and 900B illustrated in FIG. 16 increase accordingly, which results in an increase in heat generation in the transistors. This phenomenon also occurs when the excitation current is increased.

When the excitation circuit disclosed in Patent Literature 3 is employed, therefore, the increase in the complexity of the drive circuit for the high-side switches makes it difficult to reduce the size of the electromagnetic flow meter. In addition, there is a limit to the extent to which measurement stability is improved by increasing the excitation frequency or the excitation current without providing a radiator for the transistors constituting the high-side switches.

As described above, in the related art, it is difficult to achieve both measurement stability and size reduction of an electromagnetic flow meter.

SUMMARY

Accordingly, an embodiment of the present disclosure provides a small electromagnetic flow meter having high measurement stability.

An excitation circuit according to an aspect of the present disclosure (15, 15A to 15D) is an excitation circuit for supplying an excitation current (Iex) to an excitation coil (Lex) in an electromagnetic flow meter (10). The excitation circuit includes a first line (VexL) supplied with a first direct-current voltage (VexL), a second line (VexH) supplied with a second direct-current voltage (VexH) higher than the first direct-current voltage, a third line (VOUT), a first switch (S1) connected between the first line and the third line, a second switch (S2) connected between the second line and the third line, a first power supply backflow prevention element (D2) connected in series with the first switch between the first line and the third line, the first power supply backflow prevention element being configured to allow current flow from the first line to the third line and configured to block current flow in a direction opposite to the current flow from the first line to the third line, a switch circuit (S11 to S14) that applies a voltage (VOUT) of the third line to the excitation coil as an excitation voltage and that reverses a polarity of the excitation voltage in accordance with intervals at which an excitation polarity of the excitation coil is switched to change a direction of the excitation current, a current detecting element that detects (Rs) that detects the excitation current flowing through the excitation coil, a first switching control circuit (150) that switches between on and off states of the first switch at intervals shorter than the intervals at which the excitation polarity of the excitation coil is switched and that sets the current detected by the current detecting element as a first target value (Iref1), a second switching control circuit (160) that turns on the second switch when the current detected by the current detecting element is smaller than a second target value (Iref2) less than or equal to the first target value and that turns off the second switch when the current detected by the current detecting element is larger than the second target value, and at least one current-returning element (D1) that allows the excitation current to return via the switch circuit and the excitation coil when the first switch is turned off.

The excitation circuit may further include a fourth line (VexCOM) supplied with a third direct-current voltage (VexCOM) lower than the second direct-current voltage, and a fifth line (VFB). The switch circuit may include a third switch (S11) connected between the third line and a first end (n01) of the excitation coil, the third switch being switched in accordance with the intervals at which the excitation polarity of the excitation coil is switched, a fourth switch (S12) connected between the first end of the excitation coil and the fifth line, the fourth switch being switched in opposite phase to the third switch in accordance with the intervals at which the excitation polarity of the excitation coil is switched, a fifth switch (S13) connected between the third line and a second end (n02) of the excitation coil, the fifth switch being switched in opposite phase to the third switch in accordance with the intervals at which the excitation polarity of the excitation coil is switched, and a sixth switch (S14) connected between the second end of the excitation coil and the fifth line, the sixth switch being switched in phase with the third switch in accordance with the intervals at which the excitation polarity of the excitation coil is switched. The current detecting element may be a resistor connected between the fourth line and the fifth line. The first switching control circuit may switch between the on and off states of the first switch such that a voltage across the resistor matches a first reference voltage (Vref1) corresponding to the first target value. The second switching control circuit may turn on the second switch when the voltage across the resistor is lower than a second reference voltage (Vref2) corresponding to the second target value, and turn off the second switch when the voltage across the resistor is higher than the second reference voltage.

In the excitation circuit, the first switching control circuit (150A) may output a pulse-width-modulation (PWM) signal having a duty ratio of less than 100% in accordance with a difference between a current flowing through the resistor and the first target value, and perform switching of the first switch.

In the excitation circuit (15A), the first switching control circuit (150A) may include an error amplifier circuit (151) that generates an error signal corresponding to a difference between the voltage (VFB) across the resistor and the first reference voltage (Vref1), a periodic signal generation circuit (153) that generates a periodic signal, a comparator (154) that compares the error signal and the periodic signal with each other and that generates the PWM signal based on a comparison result, and a voltage limiting element (ZD1) that limits a voltage of the error signal.

In the excitation circuit (15B), the first switching control circuit (150B) may output a pulse-frequency-modulation (PFM) signal having a frequency that is variable in accordance with a difference between a current flowing through the resistor and the first target value, and perform switching of the first switch.

The excitation circuit may further include a first backflow prevention element (D11) connected in series with the third switch between the third line and the first end of the excitation coil, the first backflow prevention element being configured to allow current flow from the third line to the first end of the excitation coil and configured to block current flow in a direction opposite to the current flow from the third line to the first end of the excitation coil, a second backflow prevention element (D12) connected in series with the fourth switch between the first end of the excitation coil and the fifth line, the second backflow prevention element being configured to allow current flow from the first end of the excitation coil to the fifth line and configured to block current flow in a direction opposite to the current flow from the first end of the excitation coil to the fifth line, a third backflow prevention element (D13) connected in series with the fifth switch between the third line and the second end of the excitation coil, the third backflow prevention element being configured to allow current flow from the third line to the second end of the excitation coil and configured to block current flow in a direction opposite to the current flow from the third line to the second end of the excitation coil, and a fourth backflow prevention element (D14) connected in series with the sixth switch between the second end of the excitation coil and the fifth line, the fourth backflow prevention element being configured to allow current flow from the second end of the excitation coil to the fifth line and configured to block current flow in a direction opposite to the current flow from the second end of the excitation coil to the fifth line.

In the excitation circuit, the current-returning element may include a rectifier element (D1) connected between the third line and the fourth line, the rectifier element being configured to allow current flow from the fourth line to the third line and configured to block current flow in a direction opposite to the current flow from the fourth line to the third line.

In the excitation circuit (15C), the current-returning element ay include a first rectifier element (D1a) connected between the first end of the excitation coil and the fourth line, the first rectifier element being configured to allow current flow from the fourth line to the first end of the excitation coil and configured to block current flow in a direction opposite to the current flow from the fourth line to the first end of the excitation coil, and a second rectifier element (D1b) connected between the second end of the excitation coil and the fourth line, the second rectifier element being configured to allow current flow from the fourth line to the second end of the excitation coil and configured to block current flow in a direction opposite to the current flow from the fourth line to the second end of the excitation coil.

The excitation circuit may further include a second power supply backflow prevention element (D5) connected between the second line and the second switch, the second power supply backflow prevention element being configured to allow current flow from the second line to the second switch and configured to block current flow in a direction opposite to the current flow from the second line to the second switch, a sixth line (VIN) to which the second power supply backflow prevention element and the second switch are connected, a capacitor (C1) connected between the sixth line and the fourth line, a third rectifier element (D3) connected between the sixth line and the first end of the excitation coil, the third rectifier element being configured to allow current flow from the first end of the excitation coil to the sixth line and configured to block current flow in a direction opposite to the current flow from the first end of the excitation coil to the sixth line, and a fourth rectifier element (D4) connected between the sixth line and the second end of the excitation coil, the fourth rectifier element being configured to allow current flow from the second end of the excitation coil to the sixth line and configured to block current flow in a direction opposite to the current flow from the second end of the excitation coil to the sixth line.

In the excitation circuit, the first switching control circuit may be a single semiconductor integrated circuit.

An electromagnetic flow meter according to another aspect of the present disclosure includes a measuring pipe (Pex) in which a fluid to be measured flows, an excitation coil (Lex) external to the measuring pipe, the excitation circuit (15, 15A to 15D), a pair of electrodes (E1, E2) attached to the measuring pipe and facing each other in a direction perpendicular to a magnetic field generated from the excitation coil, and a data processing control circuit (14)

that calculates a flow rate of the fluid based on an electromotive force generated between the pair of electrodes.

In the electromagnetic flow meter, the pair of electrodes may be disposed in non-contact with the fluid in the measuring pipe.

According to an aspect of the present disclosure, a small electromagnetic flow meter having high measurement stability may be provided.

DETAILED DESCRIPTION

Figure 1:
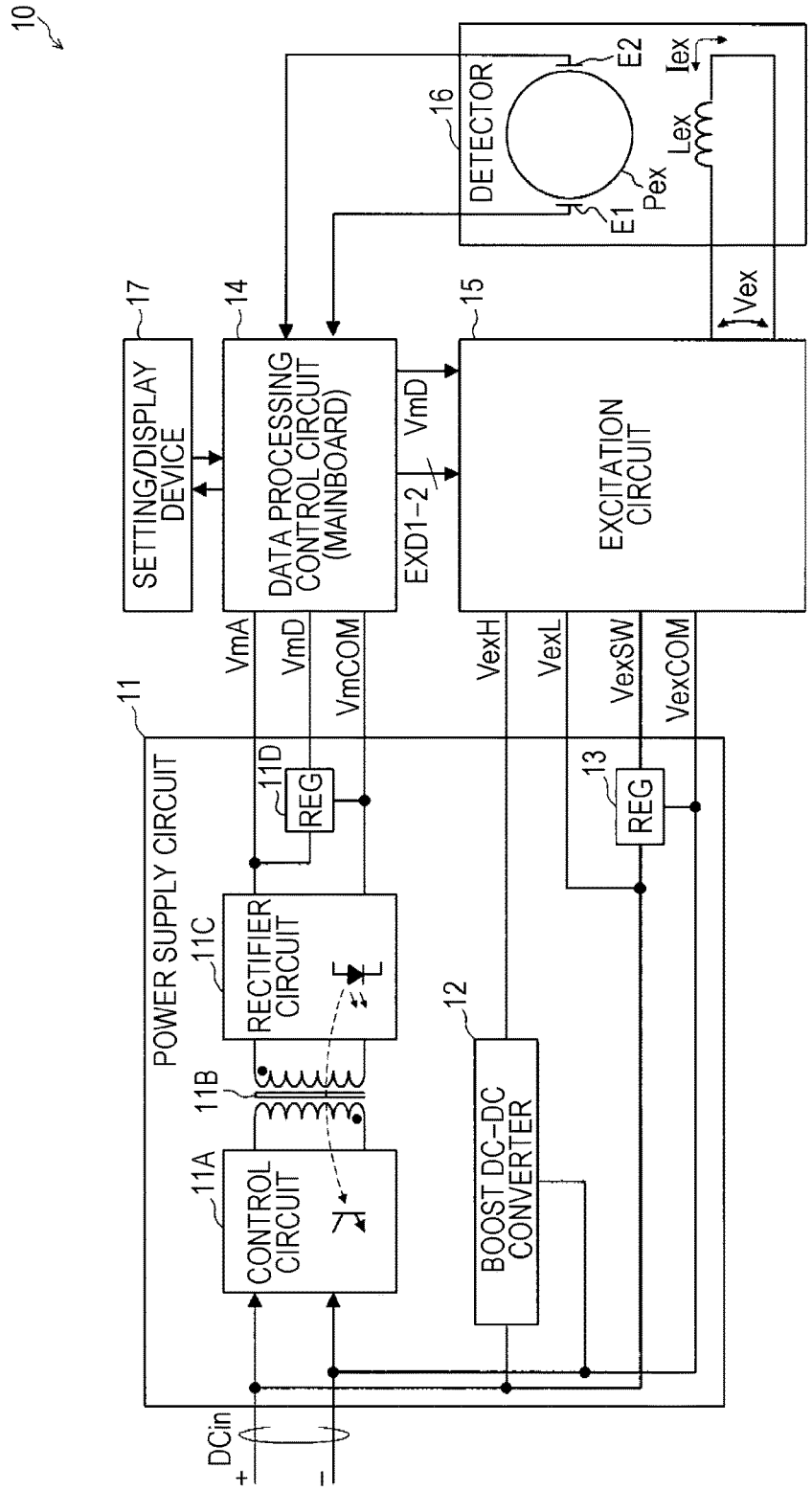
FIG. 1 illustrates the configuration of an electromagnetic flow meter including an excitation circuit according to an embodiment of the present disclosure.

Embodiments of the present disclosure will be described hereinafter with reference to the drawings. In the following description, elements common to the embodiments are identified with the same reference numerals and are not repeatedly described.

First Embodiment

Configuration of Electromagnetic Flow Meter

FIG. 1 illustrates the configuration of an electromagnetic flow meter including an excitation circuit according to an embodiment of the present disclosure.

An electromagnetic flow meter 10 illustrated in FIG. 1 has a function of measuring the flow rate of conductive fluids. An excitation coil Lex disposed so as to generate a magnetic field in a direction perpendicular to a direction of fluid flow within a measuring pipe Pex of a detector 16 is supplied with an excitation current Iex whose polarity alternates to detect an electromotive force generated between a pair of electrodes E1 and E2. The electrodes E1 and E2 are attached to the measuring pipe Pex and are disposed orthogonal to the magnetic field generated by the excitation coil Lex. The electromotive force is amplified and is then subjected to sampling followed by signal processing to measure the flow rate of a fluid flowing in the measuring pipe Pex.

Specifically, the electromagnetic flow meter 10 mainly includes circuit units, namely, a power supply circuit 11, a data processing control circuit 14, an excitation circuit 15, the detector 16, and a setting/display device 17.

The power supply circuit 11 has a function of generating a plurality of DC voltages from an input DC power supply DCin (e.g., 24 V) from a high order device (not illustrated) and supplying the DC voltages to the data processing control circuit 14 and the excitation circuit 15. Specifically, the power supply circuit 11 is mainly constituted by circuit units, namely, a control circuit 11A, a switching transformer 11B, a rectifier circuit 11C, a voltage regulator (REG) 11D, a boost DC-DC converter 12, and a voltage regulator (REG) 13.

The control circuit 11A performs switching of the input DC power supply DCin at a frequency as high as about several tens of kilohertz (kHz) to several megahertz (MHz), for example, and supplies the input DC power supply DCin to the primary winding of the switching transformer 11B. The rectifier circuit 11C rectifies a high-frequency pulse signal output from the secondary winding of the switching transformer 11B to generate a DC operating voltage VmA (e.g., 24 V) for analog signal processing and a ground potential VmCOM (0 V) and supplies the operating voltage VmA and the ground potential VmCOM to the data processing control circuit 14. The voltage regulator 11D generates an operating voltage VmD (e.g., 5V) for digital signal processing from the operating voltage VmA and supplies the operating voltage VmD to the data processing control circuit 14.

The boost DC-DC converter 12 is formed of a non-isolated boost choke converter circuit. The boost DC-DC converter 12 has a function of generating a second excitation DC voltage VexH (e.g., 80 V-24 V) and supplying the second excitation DC voltage VexH to the excitation circuit 15. The second excitation DC voltage VexH is generated by, for example, performing high-frequency switching of the input DC power supply DCin using pulse width modulation (PWM) on the basis of a clock signal CLK having a frequency as high as about several hundreds of kilohertz (kHz) and having a PWM period Tpwm to obtain a high-frequency signal and charging a capacitance element with a current flowing from the input DC power supply DCin to a choke coil via a diode using the obtained high-frequency signal. The boost DC-DC converter 12 also has a function of performing voltage feedback control and current feedback control when performing switching.

The voltage regulator 13 has a function of generating a common drive voltage VexSW (e.g., 10 V) for driving switches S11 to S14 in the excitation circuit 15 described below from the input DC power supply DCin and supplying the common drive voltage VexSW to the excitation circuit 15.

Further, a voltage of the positive pole of the input DC power supply DCin is supplied to the excitation circuit 15 as a first excitation DC voltage VexL (<VexH, for example, 24 V), and a voltage of the negative pole of the input DC power supply DCin is supplied to the excitation circuit 15 as a common voltage VexCOM (<VexL, <VexSW, for example, 0 V).

In the following description, signs used to identify voltages, such as "VexSW", "VexH", "VexL", "VexCOM", and "VmD", are also used to identify, in addition to the voltages, signal lines supplied with the corresponding voltages.

Since VexL<VexH, the first excitation DC voltage VexL is sometimes referred to as a "low voltage VexL" and the second excitation DC voltage VexH is sometimes referred to as a "high voltage VexH".

The data processing control circuit 14 includes a program processing device (e.g., a central processing unit (CPU)), a signal processing circuit, a transmission interface (I/F) circuit, and so on, and has a function of controlling the excitation circuit 15, calculating a flow rate based on an electromotive force detected from the electrodes E1 and E2 of the detector 16, and outputting a flow rate signal to the high order device.

The detector 16 includes the measuring pipe Pex in which a fluid whose flow rate is to be measured flows, the excitation coil Lex, which generates a magnetic field relative to the measuring pipe Pex by using an excitation current supplied from the excitation circuit 15, and the pair of detection electrodes E1 and E2. The detection electrodes E1 and E2 are disposed on the outer circumferential surface of the measuring pipe Pex.

The setting/display device 17 has a function of detecting a setting operation input of an operator and outputting the setting operation input to the data processing control circuit 14, and a function of displaying a display output from the data processing control circuit 14 by using a light-emitting diode (LED) or a liquid crystal display (LCD).

The excitation circuit 15 has a function of supplying the excitation current Iex whose excitation polarity is switched at constant intervals to the excitation coil Lex of the detector 16 under control of the data processing control circuit 14. The excitation circuit 15 will be described in detail hereinafter.

Configuration of Excitation Circuit According to One Embodiment

Figure 2A:
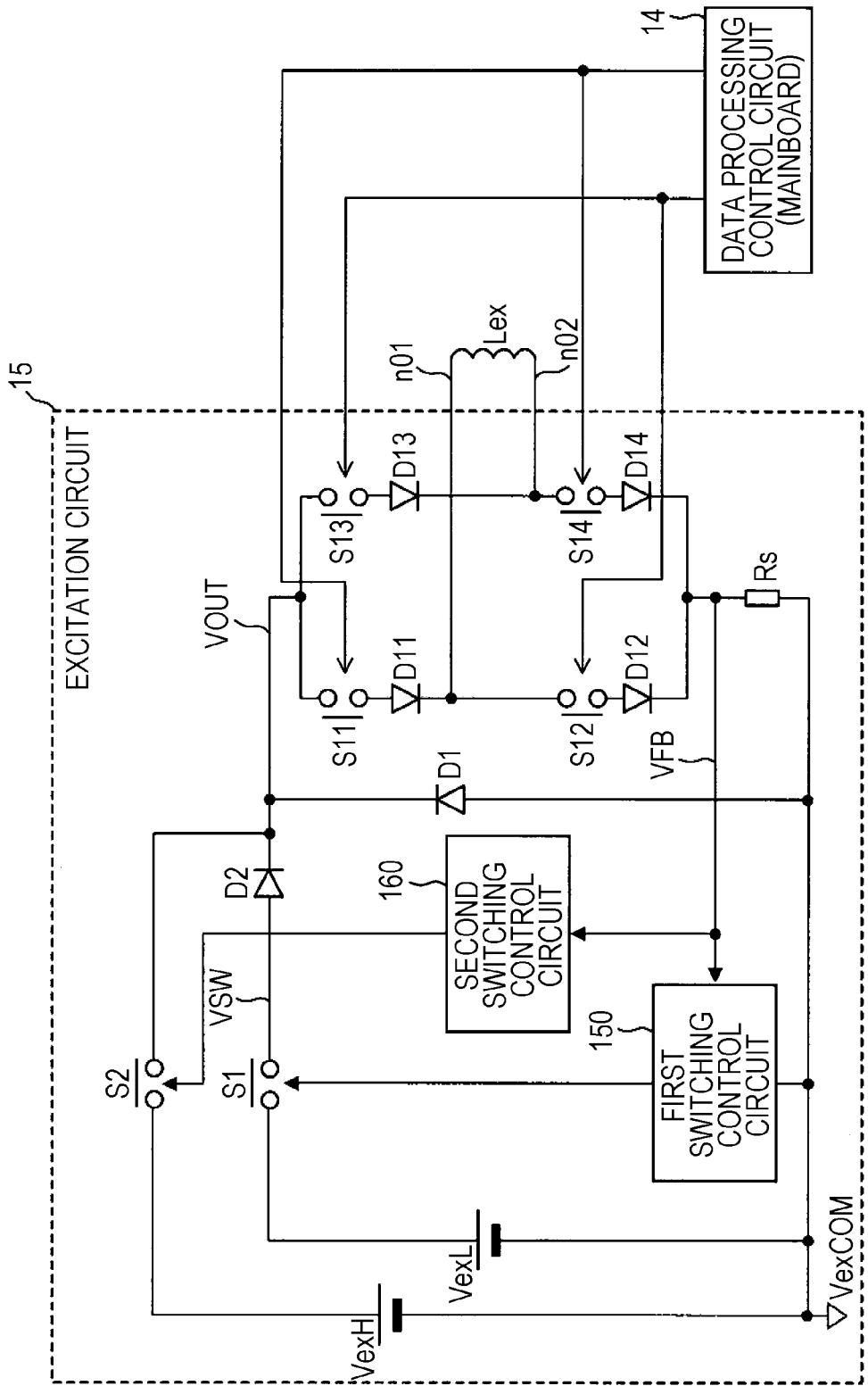
FIG. 2A conceptually illustrates the configuration of an excitation circuit according to an embodiment of the present disclosure.

FIG. 2A conceptually illustrates the configuration of an excitation circuit according to an embodiment of the present disclosure.

The excitation circuit 15 has a feature in that the switching control of the excitation polarity of the excitation coil Lex and the constant current control of the excitation current are performed by separate control mechanisms and in that the excitation coil Lex is excited by larger voltage than excitation voltage for normal constant current control immediately after the switching of the excitation polarity.

Specifically, as illustrated in FIG. 2A, the excitation circuit 15 includes a switch S1, a power supply changeover switch S2, the switches S11 to S14, diodes D1 and D2, a current-detecting resistor Rs, a switching control circuit (a first switching control circuit) 150, and a switching control circuit (a second switching control circuit) 160.

The switch S1 is an element for directly pulse-driving the excitation coil Lex by the low voltage VexL to control the excitation current Iex to be constant. The switch S1 is connected between a signal line VexL supplied with the low voltage VexL and a signal line VOUT supplied with an excitation voltage VOUT of the excitation coil Lex. The switch S1 is constituted by, for example, a power transistor.

The power supply changeover switch S2 is an element for driving the excitation coil Lex by the high voltage VexH immediately after the switching of the excitation polarity to control the excitation current Iex.

The power supply changeover switch S2 is connected between a signal line VexH supplied with the high voltage VexH and the signal line VOUT. The power supply changeover switch S2 is constituted by, for example, a power transistor.

The switches S11 to S14 constitute a switch circuit that applies the voltage VOUT to the excitation coil Lex and supplies the excitation current Iex to the excitation coil Lex and that is switched in accordance with the intervals at the excitation polarity of the excitation coil Lex is switched to reverse the polarity of the voltage VOUT to switch the direction of the excitation current Iex flowing in the excitation coil Lex.

Specifically, the switch S11 is connected between the signal line VOUT and a first end (node n01) of the excitation coil Lex, and the on and off states of the switch S11 are switched between at constant intervals.

The switch S12 is connected between a signal line VFB and the first end of the excitation coil Lex and is switched in opposite phase to the switch S11. That is, the switch S12 is turned off when the switch S11 is turned on, and is turned on when the switch S11 is turned off.

The switch S13 is connected between the signal line VOUT and a second end (node n02) of the excitation coil Lex and is switched in opposite phase to the switch S11. That is, the switch S13 is turned off when the switch S11 is turned on, and is turned on when the switch S11 is turned off.

The switch S14 is connected between the second end of the excitation coil Lex and the signal line VFB and is switched in phase with the switch S11. That is, the switch S14 is turned on when the switch S11 is turned on, and is turned off when the switch S11 is turned off.

The on and off states of the switch S1 are switched between at intervals shorter than the switching intervals of the switches S11 to S14, that is, shorter than the intervals at which the excitation polarity is switched. For example, the switching frequencies of the switches S11 to S14 are less than or equal to 1 kHz, and the switching frequency of the switch S1 is at least 10 kHz. The switch S1 is herein sometimes referred to as the "high-speed switch S1", and the switches S11 to S14 are herein sometimes referred to as the "low-speed switches S11 to S14", respectively.

The current-detecting resistor Rs is an element for detecting the excitation current Iex. The current-detecting resistor Rs is connected between a signal line VexCOM supplied with the common voltage VexCOM and the signal line VFB.

The diode D1 is a current-returning element that allows the excitation current Iex to return via the switch circuit, the excitation coil Lex, and the current-detecting resistor Rs when the high-speed switch S1 is turned off. The diode D1 has an anode connected to the signal line VexCOM and a cathode connected to the signal line VOUT.

The diode D2 is a power supply backflow prevention element for preventing current flow from the signal line VexH to the signal line VexL having a lower potential than the signal line VexH when the switch S2 is in the on state. The diode D2 is connected in series with the high-speed switch S1 between the signal line VexL and the signal line VOUT and allows the flow of current from the signal line VexL side to the signal line VOUT side but blocks the flow of current in the reverse direction. For example, the diode D2 has an anode connected to a first end of the high-speed switch S1 (a signal line VSW) and a cathode connected to the signal line VOUT.

The switching control circuit 150 is a circuit for switching between the on and off states of the switch S1 at intervals shorter than the switching intervals of the switches S11 to S14 in such a manner as to keep the current flowing through the current-detecting resistor Rs constant. Specifically, the switching control circuit 150 operates using the common voltage VexCOM as a reference power supply and generates a PWM signal whose pulse width is variable so that the current flowing through the current-detecting resistor Rs matches a first target value swi of the excitation current Iex to drive the high-speed switch S1.

More specifically, the switching control circuit 150 generates a PWM signal whose pulse width is variable in accordance with a difference between a detection voltage (feedback voltage) VFB of the current-detecting resistor Rs relative to the common voltage VexCOM and a first reference voltage Vref1 corresponding to the first target value Iref1 to drive the high-speed switch S1.

The switching control circuit 160 is a circuit that turns on the switch S2 when the excitation current Iex flowing through the current-detecting resistor Rs is lower than a second target value Iref2 (≤Iref1) and that turns off the switch S2 when the excitation current Iex flowing through the current-detecting resistor Rs is higher than the second target value Iref2.

More specifically, the switching control circuit 160 turns on the power supply changeover switch S2 when the detection voltage VFB is smaller than a second reference voltage Vref2 corresponding to the second target value Iref2, and turns off the power supply changeover switch S2 when the detection voltage VFB is larger than the second reference voltage Vref2.

The excitation circuit 15 further includes diodes D11 to D14 serving as backflow prevention elements for preventing the excitation current Iex from flowing in paths other than a path that passes through the current-detecting resistor Rs when the high-speed switch S1 is turned off.

The diode D11 is connected in series with the low-speed switch S11 between the signal line VOUT and the first end (node n01) of the excitation coil Lex. The diode D11 allows the flow of current from the signal line VOUT to the first end of the excitation coil Lex and blocks the flow of current in the reverse direction.

The diode D12 is connected in series with the low-speed switch S12 between the first end (node n01) of the excitation coil Lex and the signal line VFB. The diode D12 allows the flow of current from the first end of the excitation coil Lex to the signal line VFB and blocks the flow of current in the reverse direction.

The diode D13 is connected in series with the low-speed switch S13 between the signal line VOUT and the second end of the excitation coil Lex. The diode D13 allows the flow of current from the signal line VOUT to the second end of the excitation coil Lex and blocks the flow of current in the reverse direction.

The diode D14 is connected in series with the low-speed switch S14 between the second end of the excitation coil Lex and the signal line VFB. The diode D14 allows the flow of current from the second end of the excitation coil Lex to the signal line VFB and blocks the flow of current in the reverse direction.

Configuration of Excitation Circuit According to a First Embodiment

Next, a more specific embodiment of the excitation circuit 15 illustrated in FIG. 2A according to the present disclosure will be described.

Figure 2B:
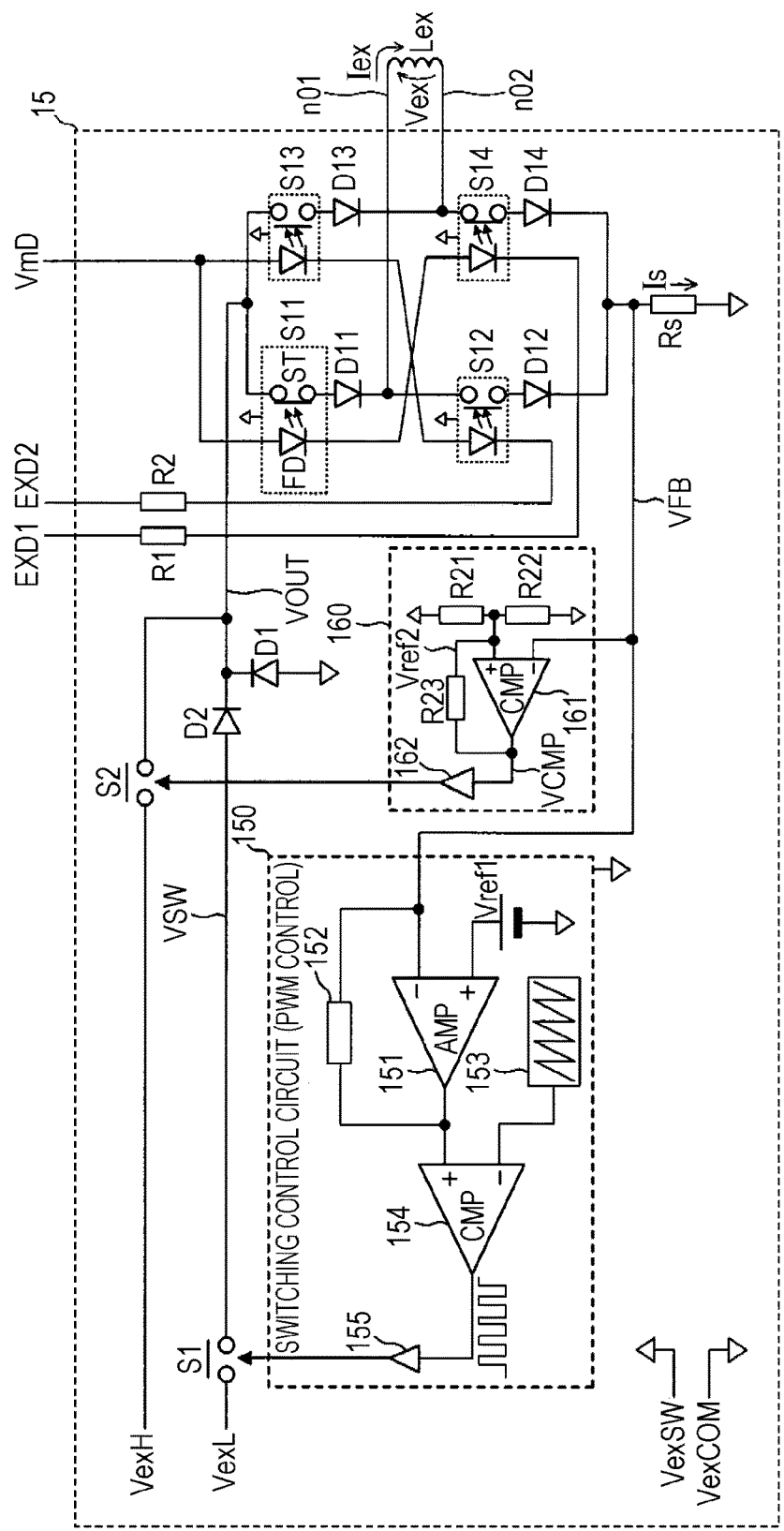
FIG. 2B illustrates the configuration of an excitation circuit according to a first embodiment.

FIG. 2B illustrates the configuration of an excitation circuit according to a first embodiment.

As illustrated in FIG. 2B, the low-speed switches S11 to S14 are configured such that on/off switching control of the low-speed switches S11 to S14 is performed in accordance with excitation polarity signals EXD1 and EXD2 from the data processing control circuit 14 (e.g., a CPU).

Specifically, in a period during which the excitation polarity of the excitation coil Lex is kept "positive", the data processing control circuit 14 (e.g., a CPU) turns on the low-speed switches S11 and S14 and turns off the low-speed switches S12 and S13. In a period during which the excitation polarity of the excitation coil Lex is kept "negative", the data processing control circuit 14 turns off the low-speed switches S11 and S14 and turns on the low-speed switches S12 and S13.

In the low-speed switches S11 to S14, the primary side to which the excitation polarity signals EXD1 and EXD2 are input and the secondary side through which the excitation current Iex flows are electrically isolated from each other. For example, the low-speed switches S11 to S14 are each constituted by a circuit including a photocoupler, and the on and off states of a switch (transistor) ST on the secondary side of the photocoupler are switched between in accordance with the intensity of light applied from a photodiode FD on the primary side of the photocoupler.

For example, the data processing control circuit 14 switches the logic (e.g., VmD for the high level and VmCOM for the low level) of the excitation polarity signals EXD1 and EXD2 with the operating voltage VmD for digital signal processing being applied to the anodes of the photodiodes FD on the primary side of the low-speed switches S11 and S13 to control the current flowing through the photodiodes FD on the primary side of the photocouplers, thereby switching between the on and off states of the switches ST on the secondary side of the photocouplers.

As described above, the switching control circuit 150 is a circuit for switching the high-speed switch S1 in accordance with the detection voltage VFB by using the PWM technique. The switching control circuit 150 may be a known general-purpose DC-DC converter control integrated circuit (IC).

The general-purpose DC-DC converter control IC may be, as illustrated in FIG. 2B, an IC configured such that only the switching control circuit 150, which controls an external power transistor serving as the high-speed switch S1 is sealed into a single package or an IC configured such that a power transistor serving as the high-speed switch S1 and a switching control circuit are sealed into a single package, regardless of whether the power transistor to be driven and the switching control circuit 150 are packaged as a single IC.

The switching control circuit 150 can be exemplified by a circuit constituted by, as illustrated in FIG. 2B, an error amplifier circuit (error amplifier) (AMP) 151, a phase compensator 152, a periodic signal generation circuit 153 that generates a periodic signal such as a saw-tooth wave or triangular wave signal, a comparator 154, and a drive circuit 155.

The error amplifier 151 generates an error signal corresponding to a difference between the detection voltage VFB of the current-detecting resistor Rs and the first reference voltage Vref1 corresponding to the first target value Iref1 of the excitation current Iex. The comparator 154 compares the error signal with a periodic signal output from the periodic signal generation circuit 153 and generates a binary signal (PWM signal) corresponding to the comparison result. The PWM signal generated by the comparator 154 is buffered by the drive circuit 155 to drive the high-speed switch S1, which is constituted by a power transistor.

As described above, the switching control circuit 160 is a functional unit that switches between the on and off states of the power supply changeover switch S2 in accordance with the relationship in magnitude between the detection voltage VFB and the second target value Iref2.

As illustrated in FIG. 2B, the switching control circuit 160 can be exemplified by a circuit constituted by resistors R21 to R23, a comparator 161, and a drive circuit 162.

The comparator 161 has an inverting input terminal (minus (−) terminal) connected to the signal line VFB.

The resistors R21 to R23 constitute a circuit for generating the second reference voltage Vref2.

For example, the resistor R21 and the resistor R22 are connected in series between a signal line VexSW and the signal line VexCOM. A common node to which the resistor R21 and the resistor R22 are connected is connected to a noninverting input terminal (plus (+) terminal) of the comparator 161. The resistor R23 is an element for causing the hysteresis of the second reference voltage Vref2 and is connected between the noninverting input terminal of the comparator 161 and an output terminal VCMP of the comparator 161.

The drive circuit 162 buffers a binary signal VCMP output from the output terminal VCMP of the comparator 161 and drives the power supply changeover switch S2, which is constituted by a power transistor.

Operation of Excitation Circuit According to the First Embodiment

Next, the operation of the excitation circuit 15 according to the first embodiment will be described in detail.

The description will be made, taking as an example the case in which the first target value Iref1, which is a target current value of the excitation current Iex, is larger than the second target value Iref2 (Vref1>Vref2).

First, the data processing control circuit 14 (e.g., a CPU) switches the logic (e.g., VmD for the high level and VmCOM for the low level) of the excitation polarity signals EXD1 and EXD2 with the operating voltage VmD for digital signal processing being applied to the anodes of the photodiodes FD on the primary side of the low-speed switches S11 and S13 to control the current flowing through the photodiodes FD on the primary side of the low-speed switches S11 to S14, thereby switching each of the low-speed switches S11 to S14 at constant intervals. As described above, the switching frequencies of the low-speed switches S11 to S14 are less than or equal to 1 kHz.

In contrast, the switching control circuit 150 switches the high-speed switch S1 at intervals shorter than the switching intervals of the low-speed switches S11 to S14, thereby outputting the low voltage VexL to the signal line VOUT, and the switching control circuit 160 switches the power supply changeover switch S2, thereby outputting the high voltage VexH to the signal line VOUT. As described above, the switching frequency of the high-speed switch 81 is greater than or equal to 10 kHz.

Through the switching operation of the high-speed switch S1, the power supply changeover switch S2, and the low-speed switches S11 to S14 described above, a DC or pulsed excitation voltage Vex having a positive or negative polarity is applied to the excitation coil Lex in accordance with the states of the low-speed switches S11 to S14. Thus, the excitation current Iex having a positive or negative polarity flows through the excitation coil Lex. The paths of the excitation current Iex will be described in detail hereinafter with reference to the drawings.

FIGS. 3A to 3D illustrate flow paths of an excitation current in an excitation circuit according to the first embodiment. In FIGS. 3A to 3D, only a circuit configuration that is part of the excitation circuit 15 is illustrated.

Here, the description will be given of the case in which the power supply changeover switch S2 is in the off state.

First, the description will be given of flow paths of current whose excitation polarity is "positive".

Figure 3A:
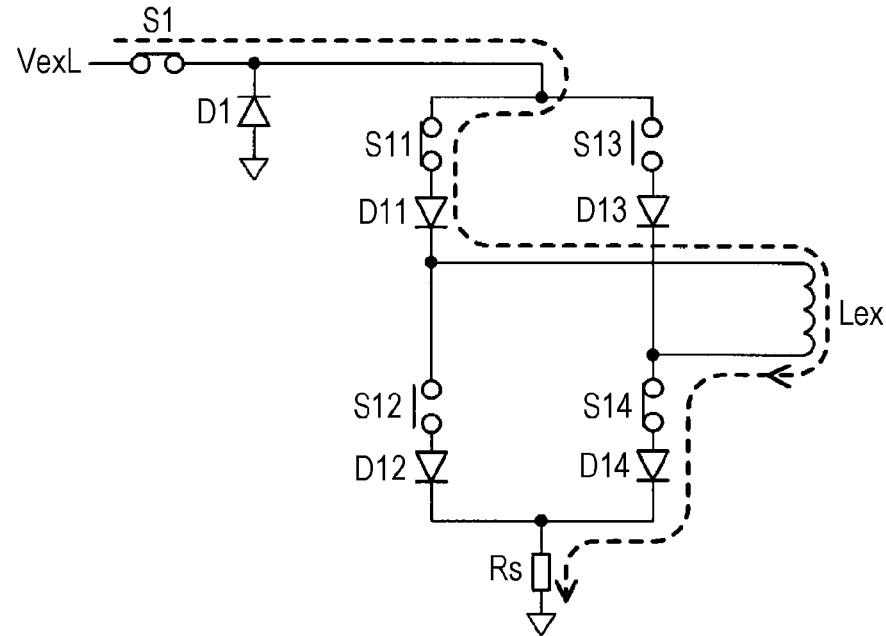
FIG. 3A illustrates a flow path of an excitation current having a positive polarity when a high-speed switch is in an on state in the excitation circuit according to the first embodiment.

When the excitation polarity is "positive", the low-speed switches S11 and S14 are turned on and the low-speed switches S12 and S13 are turned off. In this state, when the high-speed switch S1 is turned on, as illustrated in FIG. 3A, the excitation current Iex flows into the signal line VexCOM from the signal line VexL via the high-speed switch S1, the low-speed switch S11, the diode D11, the excitation coil Lex, the low-speed switch S14, the diode D14, and the current-detecting resistor Rs, and the excitation coil Lex is excited to the positive polarity. In this case, energy is stored in the excitation coil Lex.

Figure 3B:
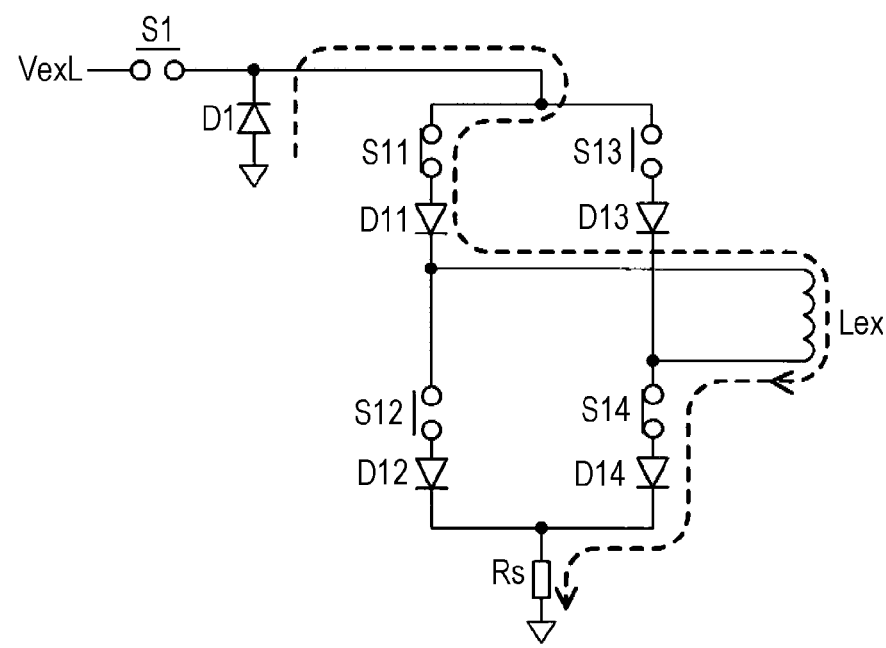
FIG. 3B illustrates a flow path of an excitation current having a positive polarity when high-speed switch is in an off state in the excitation circuit according to the first embodiment.

As illustrated in FIG. 3B, when the high-speed switch S1 is turned off, in contrast, the energy stored in the excitation coil Lex when the high-speed switch S1 is in the on state allows current to flow into the signal line VexCOM from the signal line VexCOM via the diode D1, the low-speed switch S11, the diode D11, the excitation coil Lex, the low-speed switch S14, the diode D14, and the current-detecting resistor Rs. Accordingly, the excitation current Iex having a positive polarity is held even in the period during which the high-speed switch S1 is in the off state.

Next, the description will be given of flow paths of current whose excitation polarity is "negative".

Figure 3C:
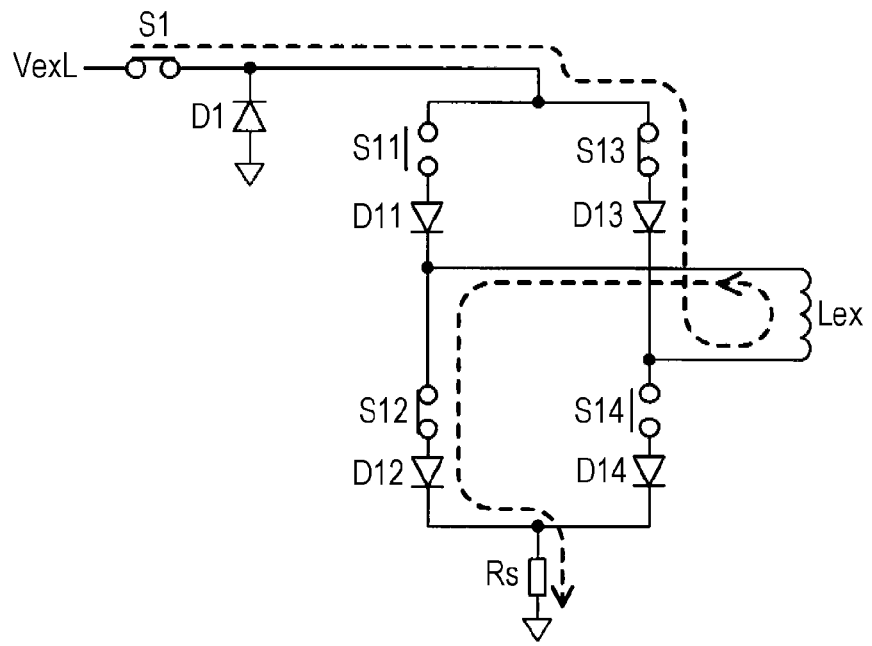
FIG. 3C illustrates a flow path of an excitation current having a negative polarity when high-speed switch is in an on state in the excitation circuit according to the first embodiment.

When the excitation polarity is "negative", the low-speed switches S11 and S14 are turned off and the low-speed switches S12 and S13 are turned on. In this state, when the high-speed switch S1 is turned on, as illustrated in FIG. 3C, the excitation current Iex flows into the signal line VexCOM from the signal line VexL via the high-speed switch S1, the low-speed switch S13, the diode D13, the excitation coil Lex, the low-speed switch S12, the diode D12, and the current-detecting resistor Rs, and the excitation coil Lex is excited to the negative polarity. In this case, energy is stored in the excitation coil Lex.

Figure 3D:
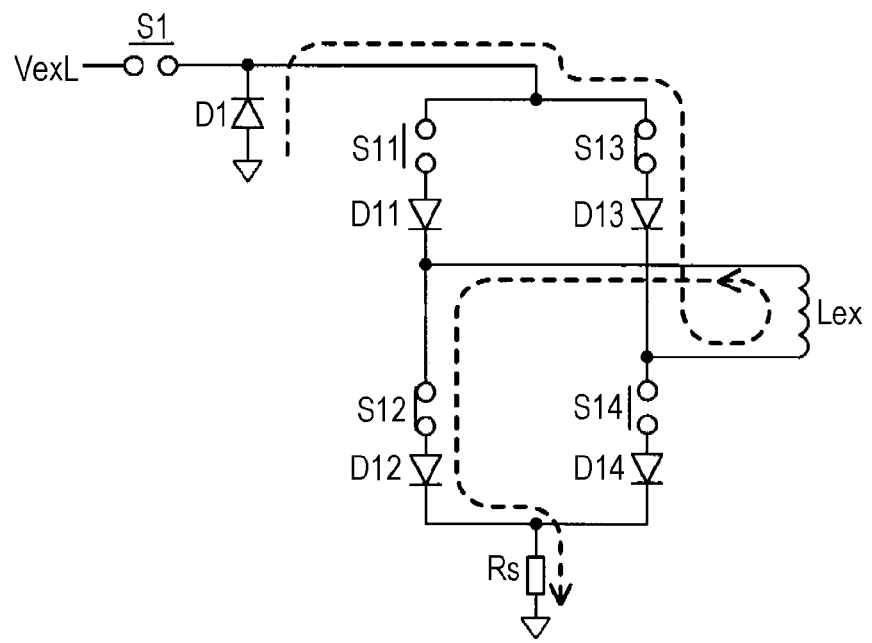
FIG. 3D illustrates a flow path of an excitation current having a negative polarity when high-speed switch is in an off state in the excitation circuit according to the first embodiment.

As illustrated in FIG. 3D, when the high-speed switch S1 is turned off, in contrast, the energy stored in the excitation coil Lex when the high-speed switch S1 is in the on state allows current to flow into the signal line VexCOM from the signal line VexCOM via the diode D1, the low-speed switch S13, the diode D13, the excitation coil Lex, the low-speed switch 812, the diode D12, and the current-detecting resistor Rs. Accordingly, the excitation current Iex having a negative polarity is held even in the period during which the high-speed switch S1 is in the off state.

The diodes D11 to D14, which serve as backflow prevention elements, will now be described in detail.

As described above, the diodes D11 to D14 are backflow prevention elements for preventing the excitation current Iex from flowing in paths other than a path that passes through the current-detecting resistor Rs (see FIGS. 3A to 3D) when the high-speed switch S1 is turned off.

Figure 4:
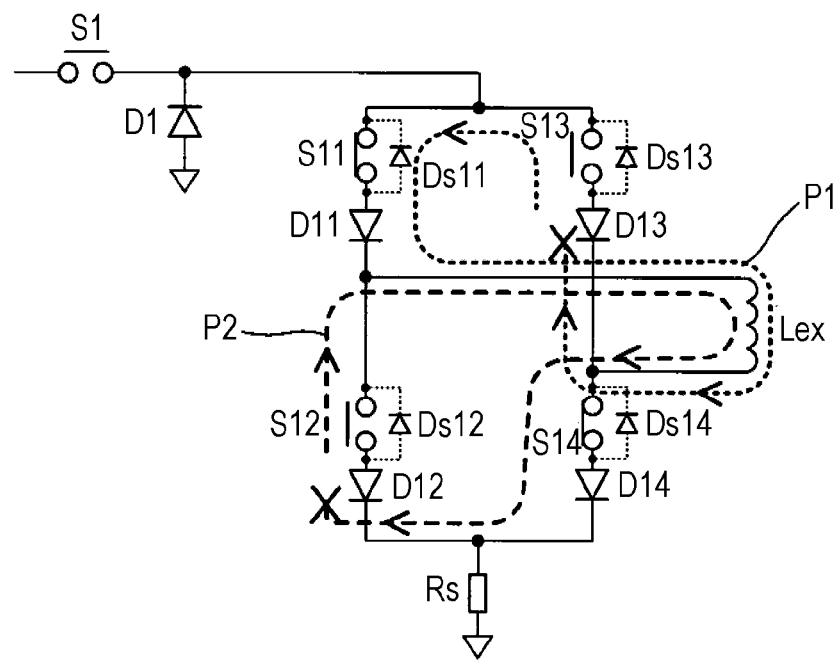
FIG. 4 illustrates the operation of a backflow prevention element.

For example, metal oxide semiconductor field-effect transistors (MOSFETs) are used as the switch elements ST on the secondary side of the low-speed switches S11 to S14, as illustrated in FIG. 4, parasitic diodes Ds11 to Ds14 are each present between the drain and source of a corresponding one of the MOSFETs. Due to the presence of the parasitic diodes Ds11 to Ds14, for example, when the high-speed switch S1 is switched from the on state to the off state while the excitation polarity is kept positive (while the low-speed switches S11 and S14 are in the on state and the low-speed switches S12 and S13 are in the off state), current may flow in a path P1 and a path P2 illustrated in FIG. 4. In this case, the diodes D12 and D13 respectively disposed in series with the low-speed switches S12 and S13 can prevent current from flowing in the paths P1 and P2.

Likewise, when the high-speed switch S1 is switched from the on state to the off state while the excitation polarity is kept negative (while the low-speed switches S11 and S14 are in the off state and the low-speed switches S12 and S13 are in the on state), the diodes D11 and D14 respectively disposed in series with the low-speed switches S11 and S14 can prevent backflow of current.

As described above, the diodes D11 to D14 disposed as appropriate as backflow prevention elements enable all of the excitation current Iex to flow through the current-detecting resistor Rs in a period during which the high-speed switch S1 is in the off state. That is, even in a situation where current flowing through the parasitic diodes Ds11 to Ds14 of the MOSFETs of the low-speed switches S11 to S14 is likely to occur, the backflow of the excitation current Iex can be prevented and all of the excitation current Iex can be caused to flow into the current-detecting resistor Rs. Thus, even in the presence of disturbance factors such as variations in the power supply voltage VexH or a change in coil resistance due to the heat generation of the excitation coil Lex, feedback control by the switching control circuit 150 enables the excitation current to be kept at a constant value, which leads to more accurate measurement and control of the excitation current Iex.

The excitation current Iex, which flows into the signal line VexCOM via the current-detecting resistor Rs, is converted into the detection voltage VFB by the current-detecting resistor Rs and is input to an inverting input terminal (minus (−) terminal) of the error amplifier circuit 151 of the switching control circuit 150 and to the inverting input terminal (minus (−) terminal) of the comparator 161 of the switching control circuit 160.

Next, the operation of the switching control circuit 150 and the switching control circuit 160 will be described in detail.

Figure 5:
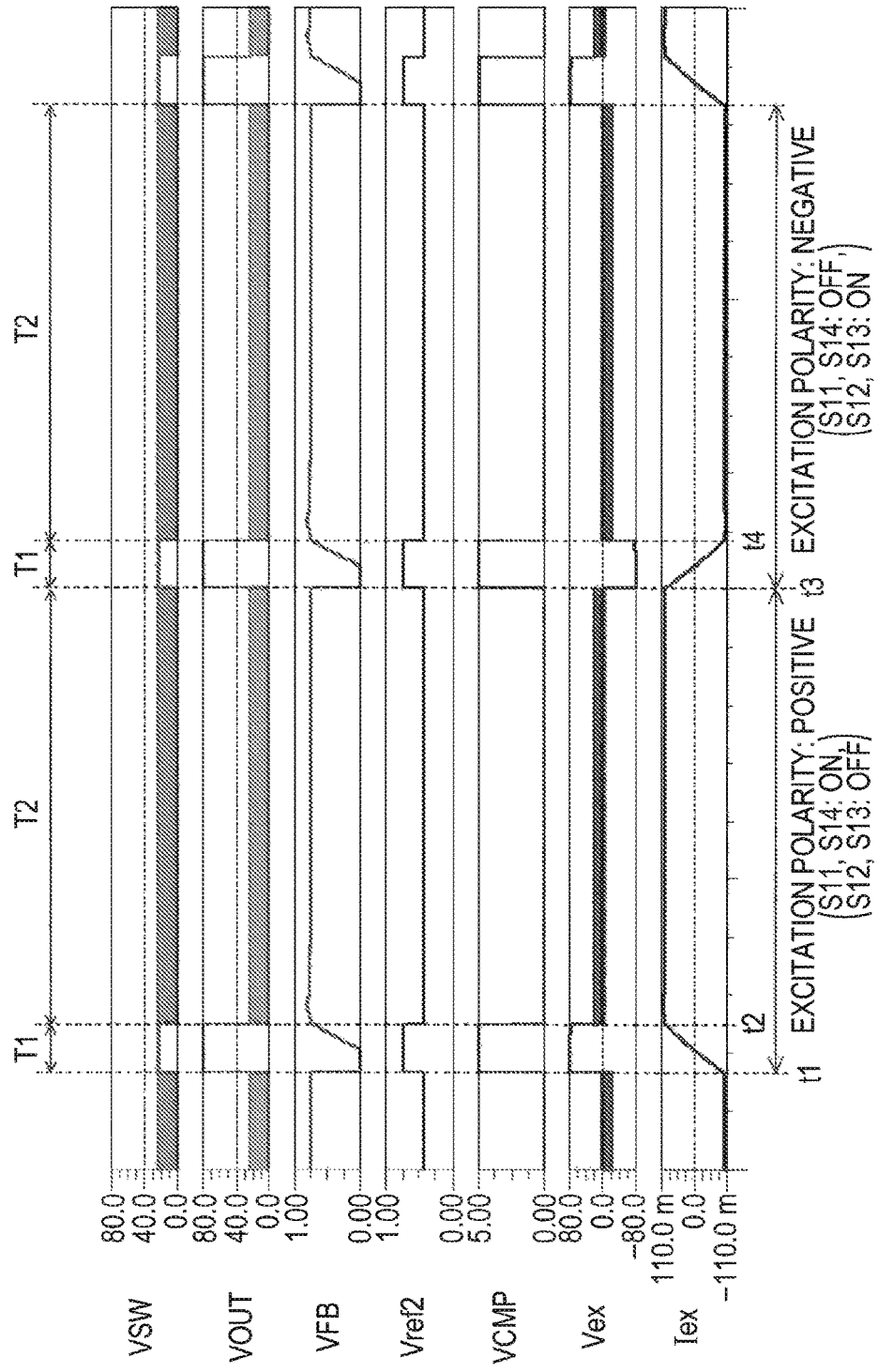
FIG. 5 is a timing chart illustrating voltages and currents at individual nodes during the operation of the excitation circuit according to the first embodiment.

FIG. 5 is a timing chart illustrating voltages and currents at the individual nodes during the operation of the excitation circuit 15 according to the first embodiment.

FIG. 5 illustrates the results of simulation performed with the high voltage VexH being equal to 80 V, the low voltage VexL being equal to 24 V, the first target current value Iref1 and the second target value Iref2 of the excitation current Iex each being set to 100 mA (absolute value), and a PWM signal obtained by the switching control circuit 150 having a maximum duty ratio (maximum pulse width) of 100%.

As illustrated in FIG. 5, at time t1, the low-speed switches S11 and S14 are turned on and the low-speed switches S12 and S13 are turned off. Thus, the polarity of the excitation current Iex is switched from negative to positive. The current of the current-detecting resistor Rs temporarily becomes 0 mA accordingly. At this time, as illustrated in FIG. 5, the detection voltage VFB of the current-detecting resistor Rs is smaller than the second reference voltage Vref2. Thus, the comparator 161 of the switching control circuit 160 outputs an output voltage VCMP having a high level to turn on the power supply changeover switch S2. Accordingly, the high voltage VexH is supplied to the signal line VOUT as a power supply voltage. As a result, the excitation current Iex gradually increases in the positive direction, and the current of the current-detecting resistor Rs gradually increases in the positive direction.

Since the detection voltage VFB is sufficiently smaller than the first reference voltage Vref1 (=Vref2), the output voltage of the error amplifier circuit 151 of the switching control circuit 150 is higher than a maximum voltage of the periodic signal (e.g., a saw-tooth wave signal) generated by the periodic signal generation circuit 153. As a result, the PWM signal output from the comparator 154 has a duty ratio up to 100%, and the high-speed switch S1 is turned on.

That is, immediately after the switching of the excitation polarity, not only the power supply changeover switch S2 but also the high-speed switch S1 is turned on. However, since VexL<VexH holds, the high voltage VexH is applied to the signal line VOUT via the power supply changeover switch S2, and the low voltage VexL is not applied to the signal line VOUT.

Thereafter, at time t2, the current of the current-detecting resistor Rs reaches the second target value (100 mA). Then, the switching control circuit 150 starts constant current control of the excitation current Iex. That is, as illustrated in FIG. 5, the detection voltage VFB becomes larger than the second reference voltage Vref2 at the time t2. Thus, the comparator 161 of the switching control circuit 160 outputs an output voltage VCMP having a low level to turn off the power supply changeover switch S2.

Accordingly, the supply of the high voltage VexH to the signal line VOUT via the power supply changeover switch S2 is stopped, and power supply is switched to supply from the low voltage VexL. Specifically, as illustrated in FIG. 5, the switching control circuit 150 drives the high-speed switch S1 with the duty ratio of the PWM signal being reduced so that the current of the current-detecting resistor Rs matches the first target value (=100 mA). Accordingly, during a period T2 after the time t2, the excitation current Iex is kept at a constant positive value (+100 mA).

Next, at time t3, the low-speed switches S11 and S14 are turned off and the low-speed switches S12 and S13 are turned on. Thus, the polarity of the excitation current Iex is switched from positive to negative. The current of the current-detecting resistor Rs temporarily becomes 0 mA accordingly. At this time, as illustrated in FIG. 5, the detection voltage VFB of the current-detecting resistor Rs is smaller than the second reference voltage Vref2. Thus, the comparator 161 of the switching control circuit 160 outputs an output voltage VCMP having a high level to turn on the power supply changeover switch S2. Accordingly, the high voltage VexH is supplied again to the signal line VOUT as a power supply voltage. As a result, the excitation current Iex gradually increases in the negative direction, and the current of the current-detecting resistor Rs gradually increases in the positive direction.

Immediately after the excitation polarity is switched from positive to negative, similarly to immediately after the excitation polarity is switched from negative to positive as described above, the high-speed switch S1 is also turned on by the switching control circuit 150 (the duty ratio of the PWM signal becomes 100%). However, since VexL<VexH holds, the high voltage VexH is applied to the signal line VOUT, and the low voltage VexL is not applied to the signal line VOUT.

Thereafter, at time t4, the current of the current-detecting resistor Rs reaches the second target value (=100 mA). Then, the switching control circuit 150 restarts constant current control of the excitation current Iex. That is, as illustrated in FIG. 5, the detection voltage VFB becomes larger than the second reference voltage Vref2 at the time t4. Thus, the comparator 161 of the switching control circuit 160 outputs an output voltage VCMP having a low level to turn off the power supply changeover switch S2.

Accordingly, the supply of the high voltage VexH to the signal line VOUT is stopped, and power supply is switched to supply from the low voltage VexL. Specifically, as illustrated in FIG. 5, the switching control circuit 150 drives the high-speed switch S1 with the duty ratio of the PWM signal being reduced so that the current of the current-detecting resistor Rs matches the first target value (=100 mA). Accordingly, the excitation current Iex is kept at a constant negative value (−100 mA).

In this way, in the excitation circuit 15 according to the first embodiment, as illustrated in FIG. 5, during a period T1 before the excitation current Iex (the current of the current-detecting resistor Rs) reaches the second target value Iref2, the excitation coil Lex is DC driven by the high voltage VexH. During the period T2 after the excitation current Iex (the current of the current-detecting resistor Rs) has reached the second target value Iref2, the excitation coil Lex is pulse-driven by the low voltage VexL.

Advantages of Excitation Circuit According to Present Disclosure

In an excitation circuit according to the present disclosure, as described above, the low-speed switches S11 to S14 for switching the excitation polarity, the high-speed switch S1 for directly pulse-driving the excitation coil Lex to perform constant current control of the excitation current, the current-detecting resistor Rs, and the excitation coil Lex are connected in the manner illustrated in FIG. 2A, and the high-speed switch S1 is driven by the switching control circuit 150 separately from the low-speed switches S11 to S14 in such a manner as to keep the current flowing through the current-detecting resistor Rs constant. This eliminates the need for a component that generates a large amount of heat, such as a power transistor, to perform constant-current control of the excitation current, unlike the excitation circuit disclosed in Patent Literature 1 described above. This configuration enables an increase in the excitation current without using a radiator, thereby achieving a small electromagnetic flow meter while improving measurement stability with an increased signal level of a flow rate signal.

In addition, due to the circuit configuration in which the excitation coil Lex is directly pulse-driven, the excitation circuit eliminates the need for a DC conversion circuit constituted by an inductor and a stabilization capacitor (output capacitor) for converting the excitation voltage into a DC voltage, unlike the excitation circuit disclosed in Patent Literature 2 described above, which results in an increase in circuit response. It is therefore possible to increase the excitation frequency and improve measurement stability.

In addition, the excitation circuit has a configuration in which the low-speed switches S11 to S14 for switching the excitation polarity and the high-speed switch S1 for directly pulse-driving the excitation coil Lex to perform constant current control of the excitation current are separately controlled. This configuration enables a drive circuit for driving the low-speed switches S11 to S14 to be implemented with a simpler circuit configuration and enables size reduction of the electromagnetic flow meter.

For example, as described above, the excitation circuit in Patent Literature 3 employs a circuit configuration in which a set of high-side switches are used for both switching of the excitation polarity and pulse driving of an excitation coil, which requires high-speed switching of the high-side switches at a minimum switching frequency of 10 kHz, leading to an increase in the complexity of a drive circuit for driving the high-side switches. In the excitation circuit according to the present disclosure, in contrast, the low-speed switches S11 to S14 are responsible only for the switching of the excitation polarity, which only requires switching of the low-speed switches S11 to S14 at a switching frequency up to 1 kHz. Since no high-speed switching is required, heat generation due to switching loss is negligible. Thus, the excitation circuit 15 according to an embodiment of the present disclosure enables an increase excitation voltage and excitation current compared with the excitation circuit of the related art, which results in further improvement in the measurement stability of the electromagnetic flow meter, compared with an excitation circuit of the related art. In addition, a drive circuit for driving the low-speed switches S11 to S14 can be implemented using a simple circuit configuration, which enables size reduction of the electromagnetic flow meter.

Furthermore, the excitation circuit according to an embodiment of the present disclosure is configured such that two voltages, namely, the high voltage VexH and the low voltage VexL, are provided as voltages for driving the excitation coil Lex to perform constant current control in such a manner that the excitation coil Lex is directly driven by the high voltage VexH when the excitation current rises and then the excitation coil Lex is pulse-driven by the low voltage VexL. This configuration can reduce stabilization period from when the excitation polarity is switched until the excitation current is stabilized at a target current value. It is therefore possible to further increase the excitation frequency and to further improve the measurement stability of the electromagnetic flow meter.

After the excitation current is stabilized at the second target value Iref2, the high-speed switch S1 is switched to pulse-drive the excitation coil Lex using the low voltage VexL, which is lower than the high voltage VexH, as a power supply voltage, which can reduce the heat generation of the high-speed switch S1 compared with the case in which the excitation coil Lex is pulse-driven using the high voltage VexH as a power supply voltage. It is therefore possible to increase the amount of current that can be supplied to the excitation coil Lex without using a radiator and to further improve the measurement stability of the electromagnetic flow meter.

In addition, the power supply changeover switch S2 that controls the supply of the high voltage VexH to the excitation coil Lex is a low-speed switching element that is turned on when the excitation current Iex is lower than the second target value Iref2, and is not configured to perform a high-speed switching operation. This configuration eliminates the need for a radiator since the heat generation of the power supply changeover switch S2 due to switching loss is negligible. Furthermore, the switching control circuit 160 that drives the power supply changeover switch S2 can be implemented using a simple circuit configuration, which contributes to a reduction in the size of the electromagnetic flow meter.

In the excitation circuit, furthermore, a general-purpose power supply IC (DC-DC converter control IC) is available as the switching control circuit 150, which enables a further reduction in the size of the electromagnetic flow meter.

As described above, the excitation circuit according to an embodiment of the present disclosure can achieve both size reduction and improvement in measurement stability, which makes it possible to achieve a small electromagnetic flow meter having high measurement stability.

In the excitation circuit 15 according to the first embodiment, since the potential of a first end of the current-detecting resistor Rs and the reference potential for the switching control circuit 150 are common (VexCOM), a second end of the current-detecting resistor Rs can be directly connected to the inverting input terminal of the error amplifier circuit 151 of the switching control circuit 150. This configuration eliminates the need for separate power supplies that are isolated from each other to detect current, a special signal conversion circuit, and the like, unlike the excitation circuit in Patent Literature 3 described above, which does not cause an increase in the complexity of the excitation circuit and enables size reduction of the electromagnetic flow meter.

In the excitation circuit 15 according to the first embodiment, furthermore, as illustrated in FIGS. 2A and 2B, the diodes D11 to D14 are respectively connected in series with the low-speed switches S11 to S14. Thus, when MOSFETs are used as switch elements on the secondary side of the low-speed switches S11 to S14, backflow of current via the parasitic diodes Ds11 to Ds14, each of which is present between the drain and source of a corresponding one of the MOSFETs, can be prevented.

Accordingly, as described above, even in a situation where current passing through the parasitic diodes Ds11 to Ds14 of the low-speed switches S11 to S14 is likely to occur, all of the excitation current Iex can be caused to flow into the current-detecting resistor Rs, which enables more accurate measurement and control of the excitation current even in the presence of disturbance factors such as variations in the power supply voltage VexH.

In addition, the diodes D11 to D14 are respectively connected in series with the low-speed switches S11 to S14, which can prevent a voltage exceeding the withstand voltage from being applied to the low-speed switches S11 to S14 due to the counter electromotive force of the excitation coil Lex, which is generated when the excitation polarity is switched.

Furthermore, hysteresis is provided for an output signal VCMP of the switching control circuit 160 for switching between the on and off states of the power supply changeover switch S2, which can prevent chattering when the on and off states of the power supply changeover switch S2 are switched between.

Second Embodiment

Configuration of Excitation Circuit According to the Second Embodiment

Figure 6:
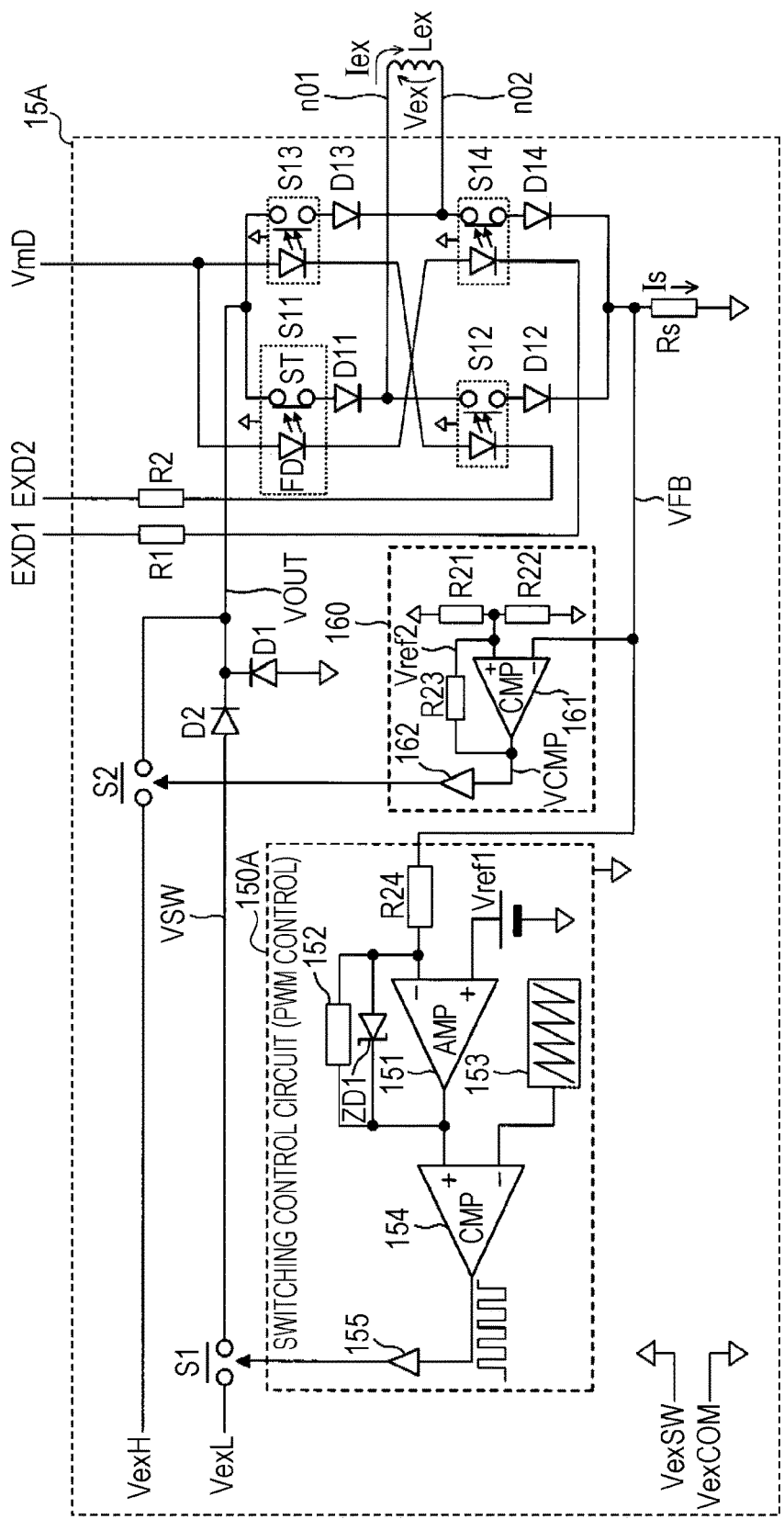
FIG. 6 illustrates the configuration of an excitation circuit according to a second embodiment.

FIG. 6 illustrates the configuration of an excitation circuit according to a second embodiment.

An excitation circuit 15A illustrated in FIG. 6 is different from the excitation circuit 15 according to the first embodiment in that a PWM signal output from a switching control circuit has a maximum duty ratio of less than 100%, and other features are similar to those of the excitation circuit 15 according to the first embodiment.

Specifically, in a switching control circuit 150A in the excitation circuit 15A, the output voltage of the error amplifier circuit 151 is limited. More specifically, as illustrated in FIG. 6, a voltage limiting element ZD1 is connected between the inverting input terminal (minus (−) terminal) of the error amplifier circuit 151 and the output terminal of the error amplifier circuit 151, and a resistor R24 is connected between the inverting input terminal and the signal line VFB. The voltage limiting element ZD1 is a Zener diode, for example, and has a cathode connected to the output terminal of the error amplifier circuit 151 and an anode connected to the inverting input terminal of the error amplifier circuit 151.

When the detection voltage VFB is lower than the first reference voltage Vref1, the error amplifier circuit 151 outputs a voltage larger than the first reference voltage Vref1. When the detection voltage VFB becomes lower, the output voltage of the error amplifier circuit 151 increases. However, the increase in the output voltage is limited when current starts to flow through the Zener diode ZD1. In this case, the constants of the Zener diode ZD1 and the resistor R24 are set so that the output voltage is lower than the maximum voltage of the output signal (e.g., a saw-tooth wave signal) (i.e., a peak voltage of the saw-tooth wave signal) of the periodic signal generation circuit 153.

Thus, the maximum duty ratio of the PWM signal output from the comparator 154 is limited to less than 100%.

Figure 7:
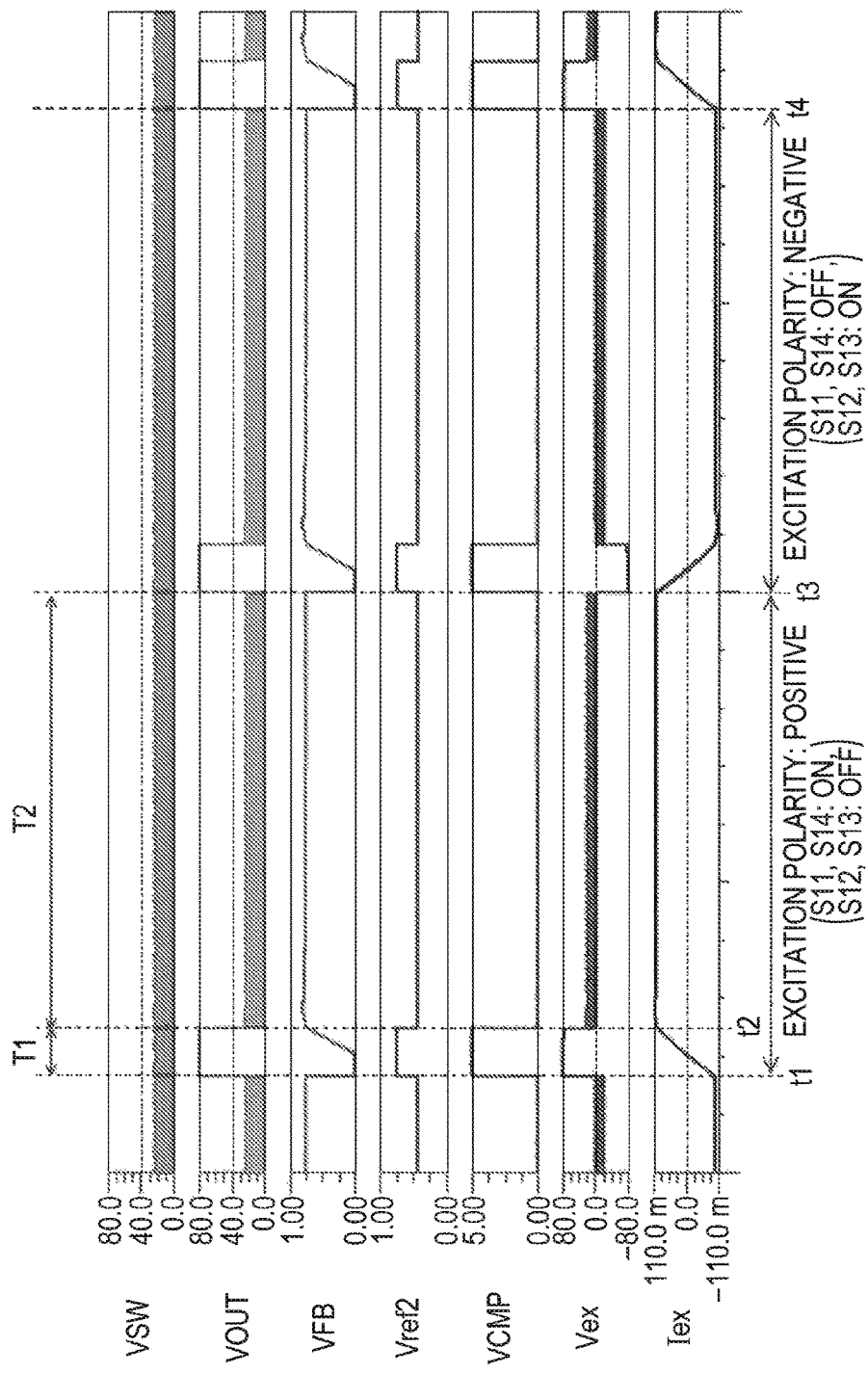
FIG. 7 is a timing chart illustrating voltages and currents at individual nodes during the operation of the excitation circuit according to the second embodiment.

FIG. 7 is a timing chart illustrating voltages and currents at the individual nodes during the operation of the excitation circuit 15A according to the second embodiment. The simulation conditions under which the simulation results illustrated in FIG. 7 are obtained are similar to those in FIG. 5 described above.

Figure 8A:
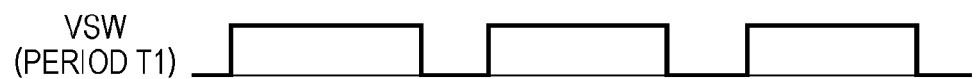
FIG. 8A illustrates a PMW signal within a certain period in the timing chart illustrated in FIG. 7.
Figure 8B:
FIG. 8B illustrates a PMW signal within another period in the timing chart illustrated in FIG. 7.

As illustrated in FIG. 7, in a period T1 during which the excitation current rises (a period during which the power supply changeover switch S2 is in the on state), as illustrated in FIG. 8A, the excitation circuit 15A remains on standby with the duty ratio of the PWM signal of the comparator 154 of the switching control circuit 150A being less than 100%. Thereafter, when the excitation current Iex rises and the power supply changeover switch S2 is turned off, as illustrated in FIG. 8B, the switching control circuit 150 further reduces the duty ratio of the PWM signal and starts the constant current control of the excitation current Iex. In this case, the constant current control is started with the duty ratio of the PWM signal of the comparator 154 lower than 100% (the state illustrated in FIG. 8A).

Advantages of Excitation Circuit According to the Second Embodiment

In the excitation circuit 15A according to the second embodiment, immediately after the switching control circuit 150A starts the constant current control of the excitation current Iex, the period of time taken for the duty ratio of the PWM signal to reach an appropriate value is short, which can prevent (or reduce) the overshoot of the excitation current Iex. It is therefore possible to further increase the excitation frequency and to further improve the measurement stability of the electromagnetic flow meter.

For example, the excitation coil Lex has a resistance Rex of 100Ω and the excitation current Iex is 100 mA. In this case, the average value Vex_ave of the excitation voltage Vex necessary for the excitation coil Lex is represented by Equation (1).

$$Vex\_ave = Rex \times Iex \quad (1)$$

In addition, the low voltage VexL is set equal to 24 V, and the excitation circuit 15A has a voltage-current conversion efficiency η of 80% during a period T2. In this case, the duty ratio D of the PWM signal is represented by Equation (2).

$$D = \frac{Vex\_ave}{VexL} \times \frac{1}{\eta} = 52[\%] \quad (2)$$

Accordingly, it is desirable that the maximum duty ratio Dmax of the PWM signal have a value greater than 52% (e.g., 65%) with consideration given to the influence of disturbance.

If the maximum duty ratio of the PWM signal is not limited, the duty ratio of the PMW signal changes from 100% to 52% for a period from the timing at which the power supply changeover switch S2 is turned off until the excitation current Iex becomes stable. If the maximum duty ratio of the PWM signal is limited to 65% in the way described above, in contrast, the duty ratio of the PWM signal changes from 65% to 52% for a period from the timing at which the power supply changeover switch S2 is turned off until the excitation current Iex becomes stable. Therefore, the overshoot of the excitation current Iex is reduced compared with the case in which the duty ratio of the PWM signal is not limited, which enables a further reduction in stabilization period.

Third Embodiment

Configuration of Excitation Circuit According to the Third Embodiment

Figure 9:
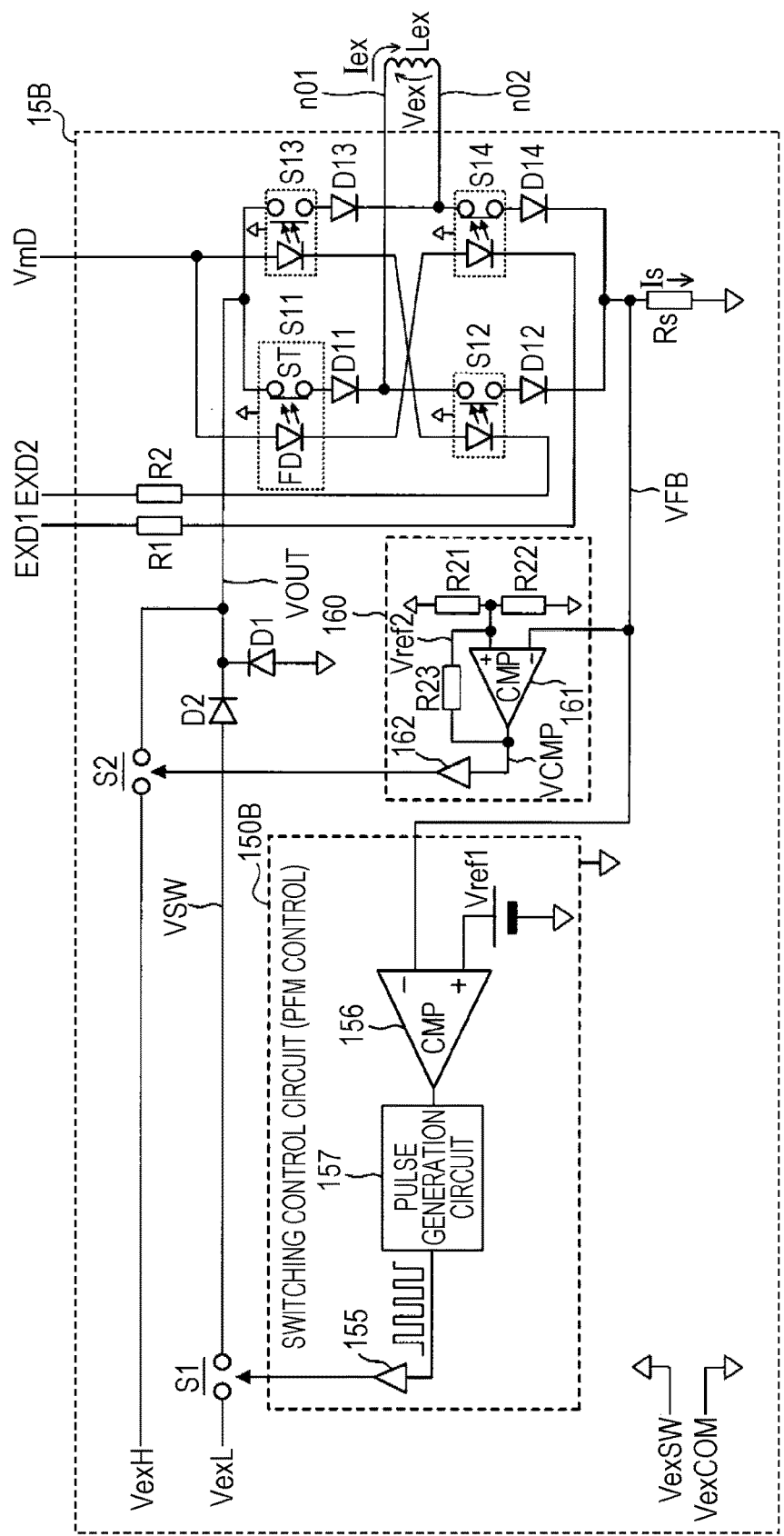
FIG. 9 illustrates the configuration of an excitation circuit according to a third embodiment.

FIG. 9 illustrates the configuration of an excitation circuit according to a third embodiment.

An excitation circuit 15B illustrated in FIG. 9 is different from the excitation circuit 15 according to the first embodiment in that a switching control circuit drives the high-speed switch S1 by using pulse frequency modulation (PFM) control, and other features are similar to those of the excitation circuit 15 according to the first embodiment.

Specifically, the excitation circuit 15B includes a circuit for driving the high-speed switch S1, namely, a switching control circuit 150B for controlling the high-speed switch S1 in accordance with the detection voltage VFB of the current-detecting resistor Rs by using the PFM technique.

The switching control circuit 150B generates a PFM signal whose frequency is variable in accordance with a difference between the current flowing through the current-detecting resistor Rs and a target current value and performs switching of the high-speed switch S1 based on the PFM signal.

The switching control circuit 150B can be exemplified by, as illustrated in FIG. 9, a circuit constituted by a comparator (CMP) 156, a pulse generation circuit 157, and the drive circuit 155.

The comparator (CMP) 156 compares the first reference voltage Vref1 corresponding to the first target value Iref1 of the excitation current Iex with the detection voltage VFB obtained by the current-detecting resistor Rs and outputs a comparison result. The pulse generation circuit 157 outputs a binary signal having a fixed pulse width (on-time) at intervals based on the comparison result of the comparator 156. The drive circuit 155 buffers the binary signal (PFM signal) output from the pulse generation circuit 157 and drives the high-speed switch S1, which is constituted by a power transistor.

Advantages of Excitation Circuit According to the Third Embodiment

The excitation circuit 15B according to the third embodiment, which includes no error amplifier circuit (or phase compensator), provides a higher response speed than that based on the PWM technique. It is therefore possible to further increase the excitation frequency and to further improve the measurement stability of the electromagnetic flow meter.

Fourth Embodiment

Configuration of Excitation Circuit According to the Fourth Embodiment

Figure 10:
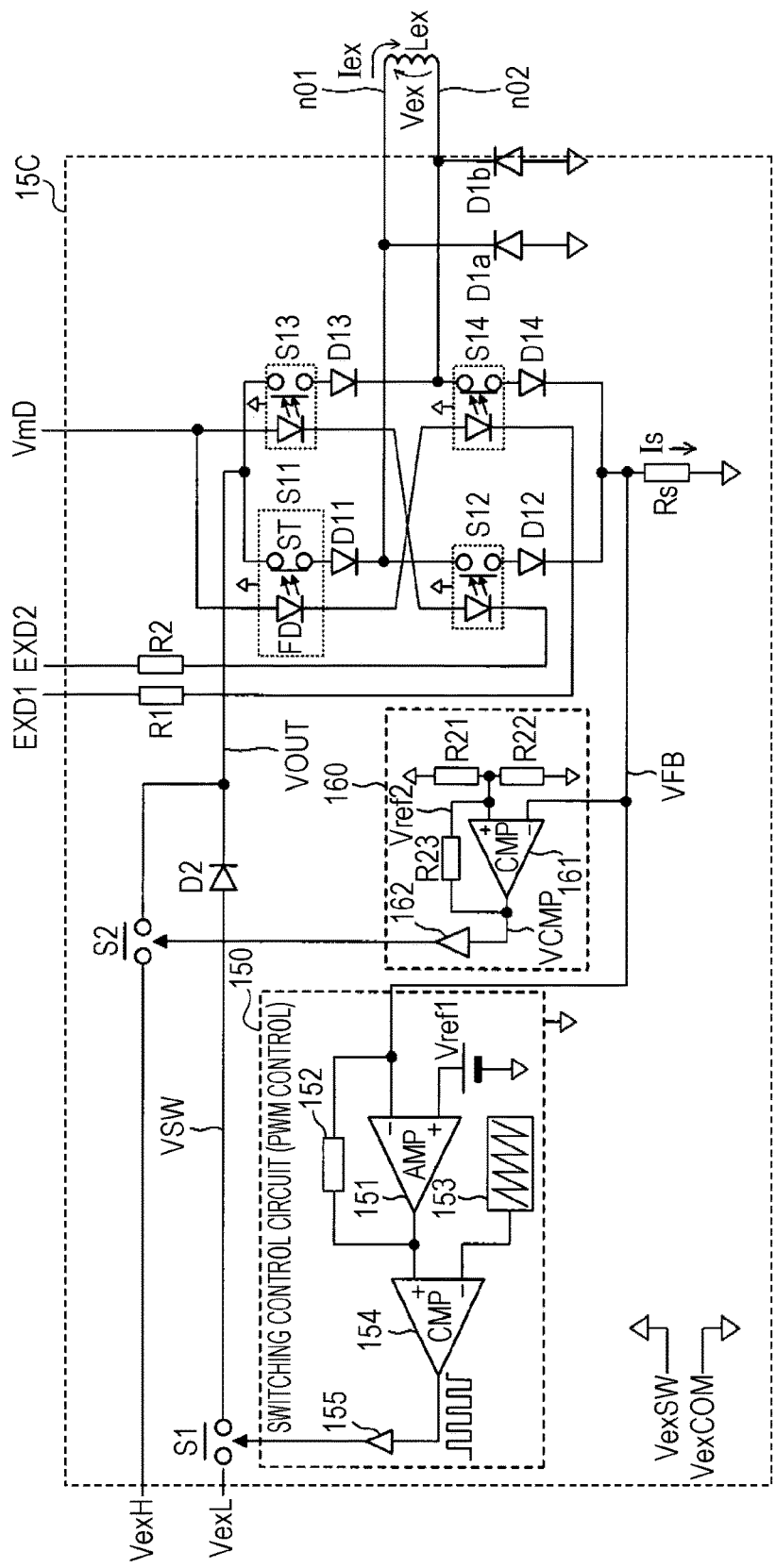
FIG. 10 illustrates the configuration of an excitation circuit according to a fourth embodiment.

FIG. 10 illustrates the configuration of an excitation circuit according to a fourth embodiment.

Unlike the excitation circuit 15 according to the first embodiment, an excitation circuit 15C illustrated in FIG. 10 includes two flywheel diodes that serve as current-returning elements, and other features are similar to those of the excitation circuit 15 according to the first embodiment.

Specifically, the excitation circuit 15C includes diodes D1a and D1b, instead of the diode D1, as current-returning elements. The diode D1a has an anode connected to the signal line VexCOM and a cathode connected to the first end (node n01) of the excitation coil Lex. The diode D1b has an anode connected to the signal line VexCOM and a cathode connected to the second end (node n02) of the excitation coil Lex.

Here, a flow path of the excitation current Iex in the excitation circuit 15C when the power supply changeover switch S2 is turned off will be described with reference to the drawings.

FIGS. 11A to 11D illustrate flow paths of an excitation current in the excitation circuit 15C according to the fourth embodiment. In FIGS. 11A to 11D, only a circuit configuration that is part of the excitation circuit 15C is illustrated.

First, the description will be given of flow paths of current whose excitation polarity is "positive".

Figure 11A:
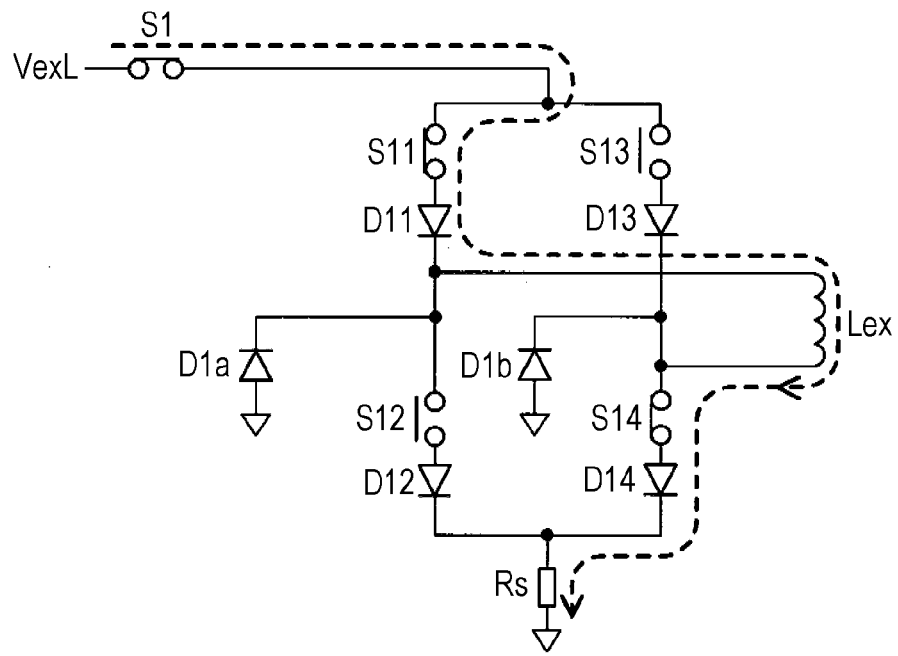
FIG. 11A illustrates a flow path of an excitation current having a positive polarity when a high-speed switch is in an on state in the excitation circuit according to the fourth embodiment.

When the excitation polarity is "positive", the low-speed switches S11 and S14 are turned on and the low-speed switches S12 and S13 are turned off. In this state, the flow path of current when the high-speed switch S1 is turned on is similar to that in the excitation circuit 15 according to the first embodiment. Specifically, as illustrated in FIG. 11A, the excitation current Iex flows into the signal line VexCOM from the signal line VexL via the high-speed switch S1, the low-speed switch S11, the diode D11, the excitation coil Lex, the low-speed switch 814, the diode D14, and the current-detecting resistor Rs, and the excitation coil Lex is excited to the positive polarity. In this case, energy is stored in the excitation coil Lex.

Figure 11B:
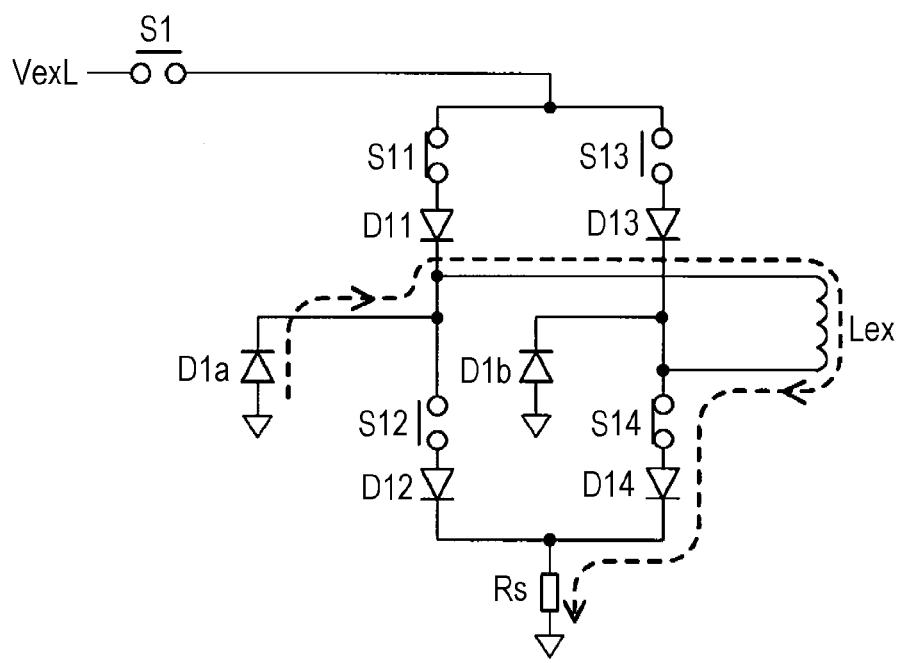
FIG. 11B illustrates a flow path of an excitation current having a positive polarity when high-speed switch is in an off state in the excitation circuit according to the fourth embodiment.

When the high-speed switch S1 is turned off, on the other hand, as illustrated in FIG. 11B, the energy stored in the excitation coil Lex when the high-speed switch S1 is in the on state allows current to flow into the signal line VexCOM from the signal line VexCOM via the diode D1a, the excitation coil Lex, the low-speed switch S14, the diode D14, and the current-detecting resistor Rs. Accordingly, the excitation current Iex having a positive polarity is held even in the period during which the high-speed switch S1 is in the off state.

Next, the description will be given of flow paths of current whose excitation polarity is "negative".

Figure 11C:
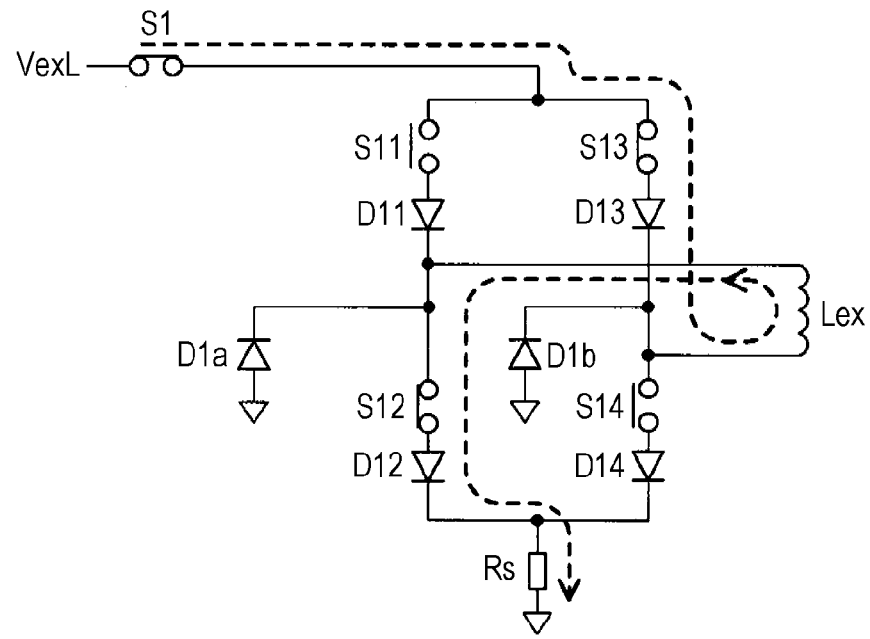
FIG. 11C illustrates a flow path of an excitation current having a negative polarity when high-speed switch is in an on state in the excitation circuit according to the fourth embodiment.

When the excitation polarity is "negative", the low-speed switches S11 and S14 are turned off and the low-speed switches S12 and S13 are turned on. In this state, the flow path of current when the high-speed switch S1 is turned on is similar to that in the excitation circuit 15 according to the first embodiment. Specifically, as illustrated in FIG. 11C, the excitation current Iex flows into the signal line VexCOM from the signal line VexL via the high-speed switch S1, the low-speed switch S13, the diode D13, the excitation coil Lex, the low-speed switch S12, the diode D12, and the current-detecting resistor Rs, and the excitation coil Lex is excited to the negative polarity. In this case, energy is stored in the excitation coil Lex.

Figure 11D:
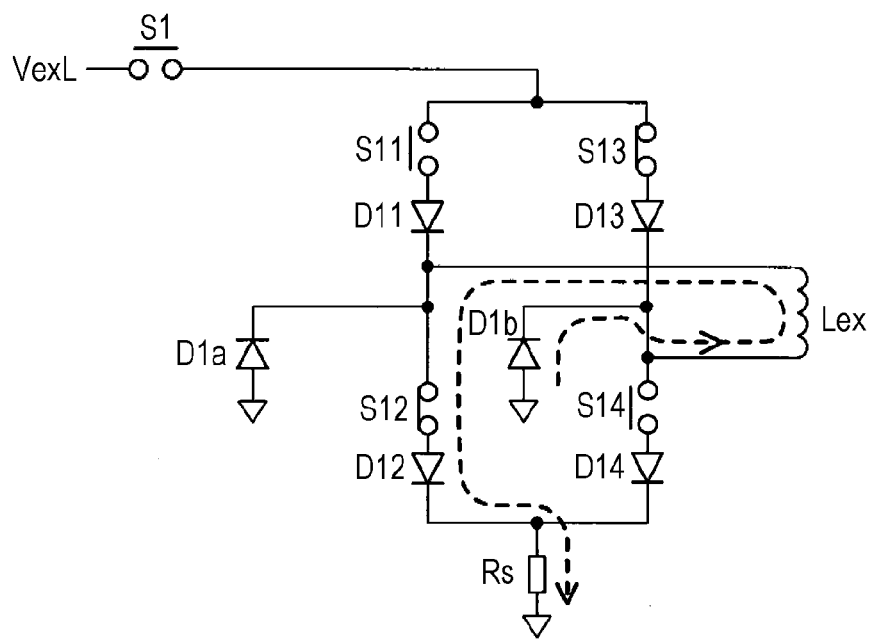
FIG. 11D illustrates a flow path of an excitation current having a negative polarity when high-speed switch is in an off state in the excitation circuit according to the fourth embodiment.

When the high-speed switch S1 is turned off, on the other hand, as illustrated in FIG. 11D, the energy stored in the excitation coil Lex when the high-speed switch S1 is in the on state allows current to flow into the signal line VexCOM from the signal line VexCOM via the diode D1b, the excitation coil Lex, the low-speed switch S12, the diode D12, and the current-detecting resistor Rs. Accordingly, the excitation current Iex having a negative polarity is held even in the period during which the high-speed switch S1 is in the off state.

Accordingly, the excitation circuit 15C enables the excitation current Iex to return via the diode D1a when the high-speed switch S1 is turned off in the case where the excitation polarity is positive, and enables the excitation current Iex to return via the diode D1b when the high-speed switch S1 is turned off in the case where the excitation polarity is negative.

Advantages of Excitation Circuit According to the Fourth Embodiment

In the excitation circuit 15C according to the fourth embodiment, the excitation current returns via different diodes, namely, the diodes D1a and D1b, when the excitation polarity is positive and negative, respectively, which can reduce the average value of the amount of heat generated per diode compared with when the current returns by using the single diode D1, regardless of the excitation polarity. This configuration enables a further increase in excitation current and enables further improvement in the measurement stability of the electromagnetic flow meter.

Fifth Embodiment

Configuration of Excitation Circuit According to the Fifth Embodiment

Figure 12:
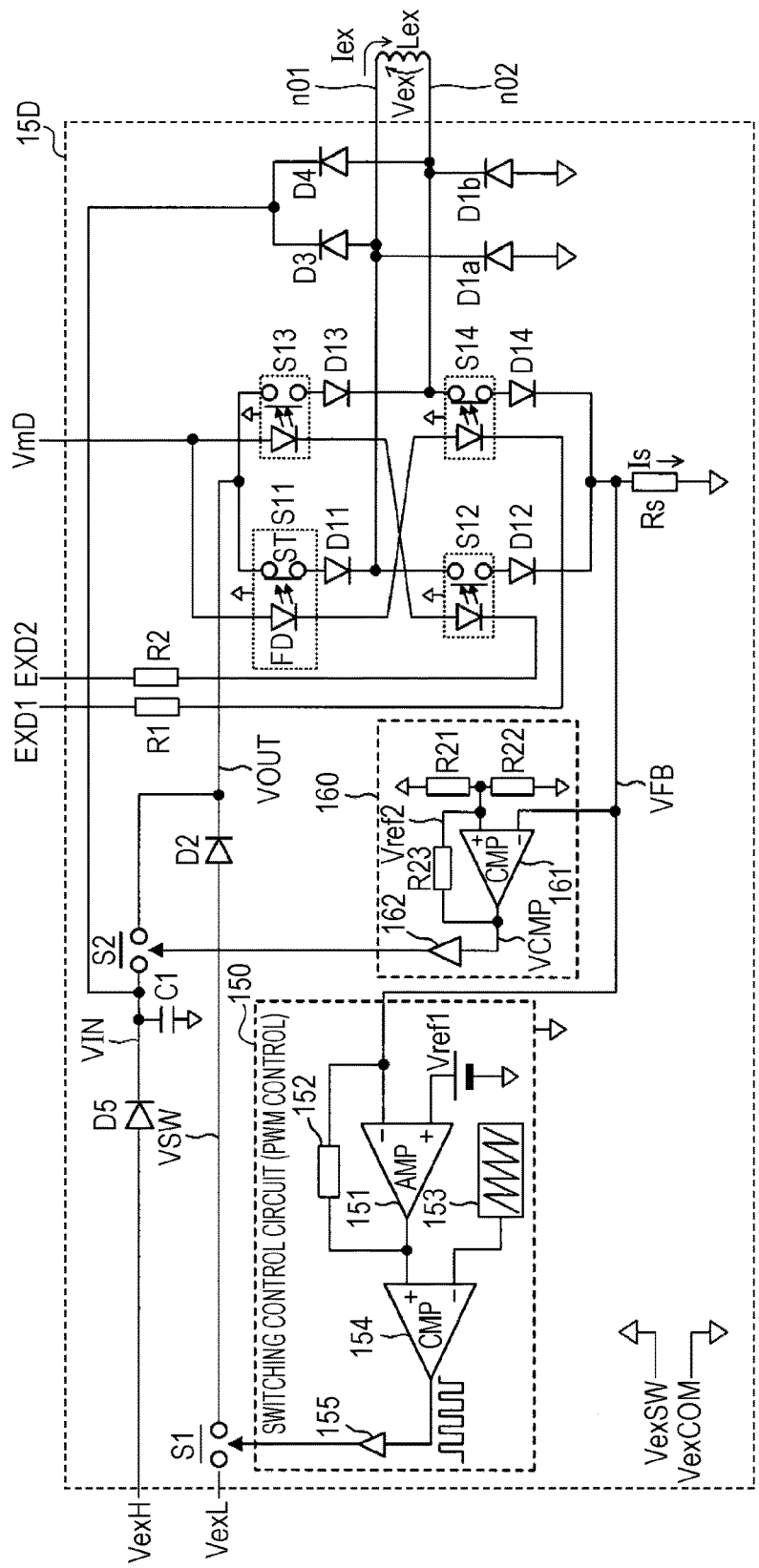
FIG. 12 illustrates the configuration of an excitation circuit according to a fifth embodiment.

FIG. 12 illustrates the configuration of an excitation circuit according to a fifth embodiment.

Unlike the excitation circuit 15C according to the fourth embodiment, an excitation circuit 15D illustrated in FIG. 12 has a function of generating larger excitation voltage by using the counter electromotive force of an excitation coil, and other features are similar to those of the excitation circuit 15C according to the fourth embodiment.

The excitation circuit 15D has a function of charging the counter electromotive force of the excitation coil Lex, which is generated immediately after the switching of the excitation polarity, in a capacitor to collect the counter electromotive force, and using the voltage charged in the capacitor as a power supply voltage (excitation voltage Vex) the next time the excitation current rises.

More specifically, the excitation circuit 15D further includes diodes D3, D4, and D5 and a capacitor C1 in addition to the configuration of the excitation circuit 15C according to the fourth embodiment.

The diode D5 is a backflow prevention element for preventing the backflow of current to the signal line VexH. The diode D5 has an anode connected to the signal line VexH and a cathode connected to a first end (signal line VIN) of the power supply changeover switch S2.

The capacitor C1 has a first end connected to the signal line VIN and a second end connected to the signal line VexCOM.

The diodes D3 and D4 are bridge diodes (plus (+) voltage side) for collecting the counter electromotive force. The diodes D1a and D1b have both a function of a bridge diode (minus (−) voltage side) for collecting the counter electromotive force and a function as a current-returning element for, as in the excitation circuit 15C according to the fourth embodiment, allowing the excitation current Iex to return when the high-speed switch S1 is in the off state.

The diode D3 has an anode connected to the first end (node n01) of the excitation coil Lex and a cathode connected to the signal line VIN.

The diode D4 has an anode connected to the second end (node n02) of the excitation coil Lex and a cathode connected to the signal line VIN.

Figure 13:
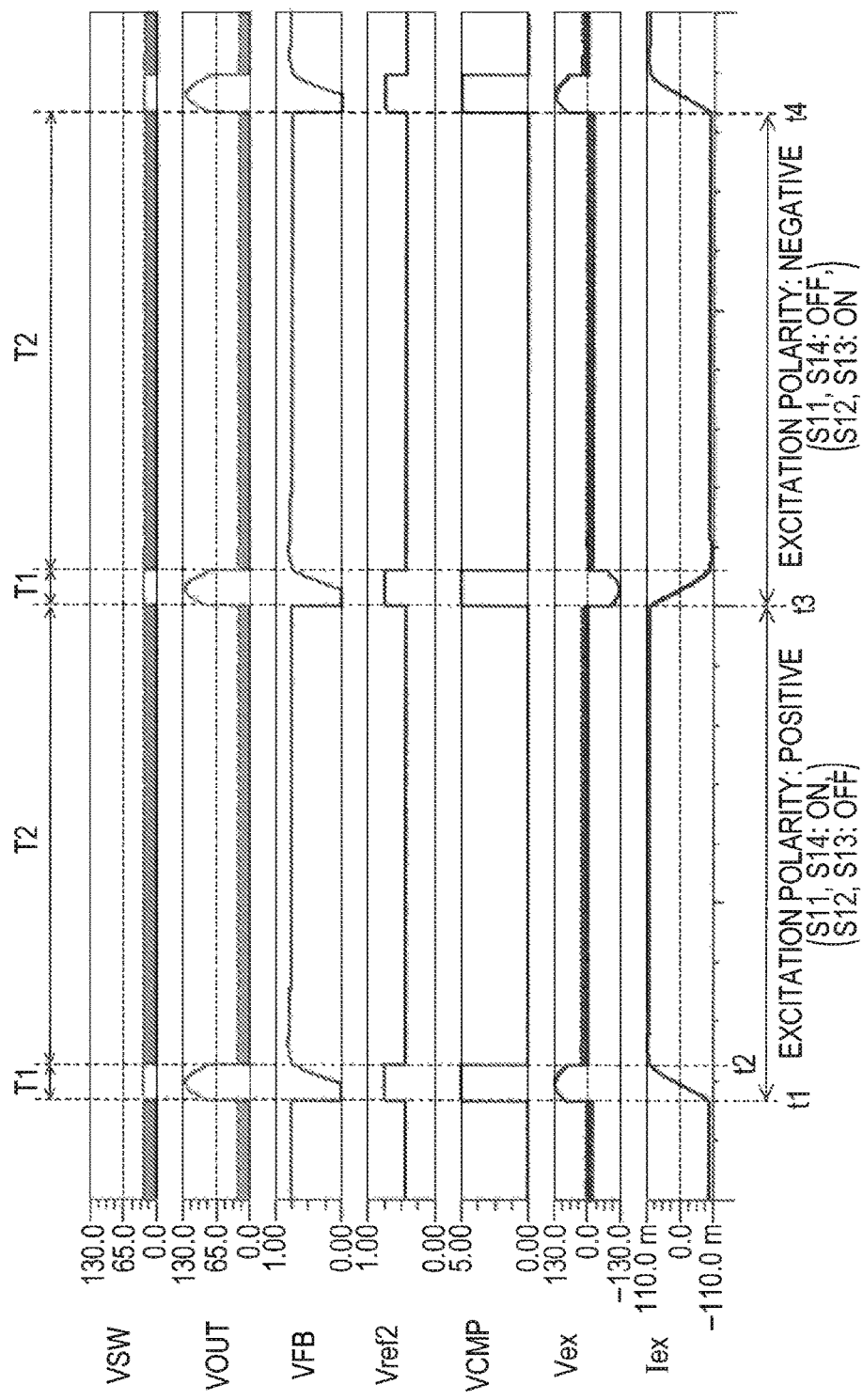
FIG. 13 is a timing chart illustrating voltages and currents at individual nodes during the operation of the excitation circuit according to the fifth embodiment.

FIG. 13 is a timing chart illustrating voltages and currents at the individual nodes in the excitation circuit 15D according to the fifth embodiment. The simulation conditions under which the simulation results illustrated in FIG. 13 are obtained are similar to those in FIG. 5 described above.

As illustrated in FIG. 13, at time t1, when the excitation polarity of the excitation coil Lex is switched from negative to positive (when the switches S11 and S14 are turned on and the switches S12 and S13 are turned off), a counter electromotive voltage is generated across the excitation coil Lex in a direction in which the excitation current Iex having a negative polarity is maintained. Due to the counter electromotive voltage, electric charge is charged in the capacitor C1 from the diode D3 and a voltage VIN exceeding the high voltage VexH is applied to the signal line VIN. In this case, the diode D5 prevents the backflow of current toward the signal line VexH.

Thus, when the excitation current Iex rises, an excitation voltage Vex larger than the high voltage VexH can be applied to the excitation coil Lex, which enables a further reduction in the rise time of the excitation current Iex.

In a period after time t2 after the excitation current Iex rises, control similar to that in the excitation circuit 15C according to the fourth embodiment is performed. That is, when the high-speed switch S1 is in the on state, the low voltage VexL is applied to the excitation coil Lex via the high-speed switch S1 and the excitation current Iex flows in a path similar to that in FIG. 11A. When the high-speed switch S1 is in the off state, in contrast, the excitation current Iex flows in a path similar to that in FIG. 11B via the diode D1a.

Thereafter, at time t3 in FIG. 13, the excitation polarity of the excitation coil Lex is switched from positive to negative (the switches S11 and S14 are turned off and the switches S12 and S13 are turned on). Then, a counter electromotive voltage is generated across the excitation coil Lex in a direction in which the excitation current Iex having a positive polarity is maintained. Due to the counter electromotive voltage, electric charge is charged in the capacitor C1 from the diode D4 and a voltage VIN exceeding the high voltage VexH is applied to the signal line VIN.

Thus, when the excitation current Iex falls, an excitation voltage Vex larger than the high voltage VexH can also be applied to the excitation coil Lex, which enables a further reduction in the fall time of the excitation current Iex.

In a period after time t4 after the excitation current Iex falls, control similar to that in the excitation circuit 15C according to the fourth embodiment is performed. That is, when the high-speed switch S1 is in the on state, the low voltage VexL is applied to the excitation coil Lex via the high-speed switch S1 and the excitation current Iex flows in a path similar to that in FIG. 11C. When the high-speed switch S1 is in the off state, in contrast, the excitation current Iex flows in a path similar to that in FIG. 11D via the diode D1b.

Advantages of Excitation Circuit According to Fifth Embodiment

The excitation circuit 15D according to the fifth embodiment allows the excitation coil Lex to be excited by voltage larger than the high voltage VexH, which enables a further reduction in the time taken until the excitation current Iex becomes stable (stabilization period). It is therefore possible to further increase the excitation frequency and to further improve the measurement stability of the electromagnetic flow meter.

Extended Embodiments

While the disclosure made by the inventors has been specifically described with reference to some embodiments thereof, the present disclosure is not limited to these embodiments. It is to be understood that a variety of modifications can be made without departing from the gist of the present disclosure.

Figure 14:
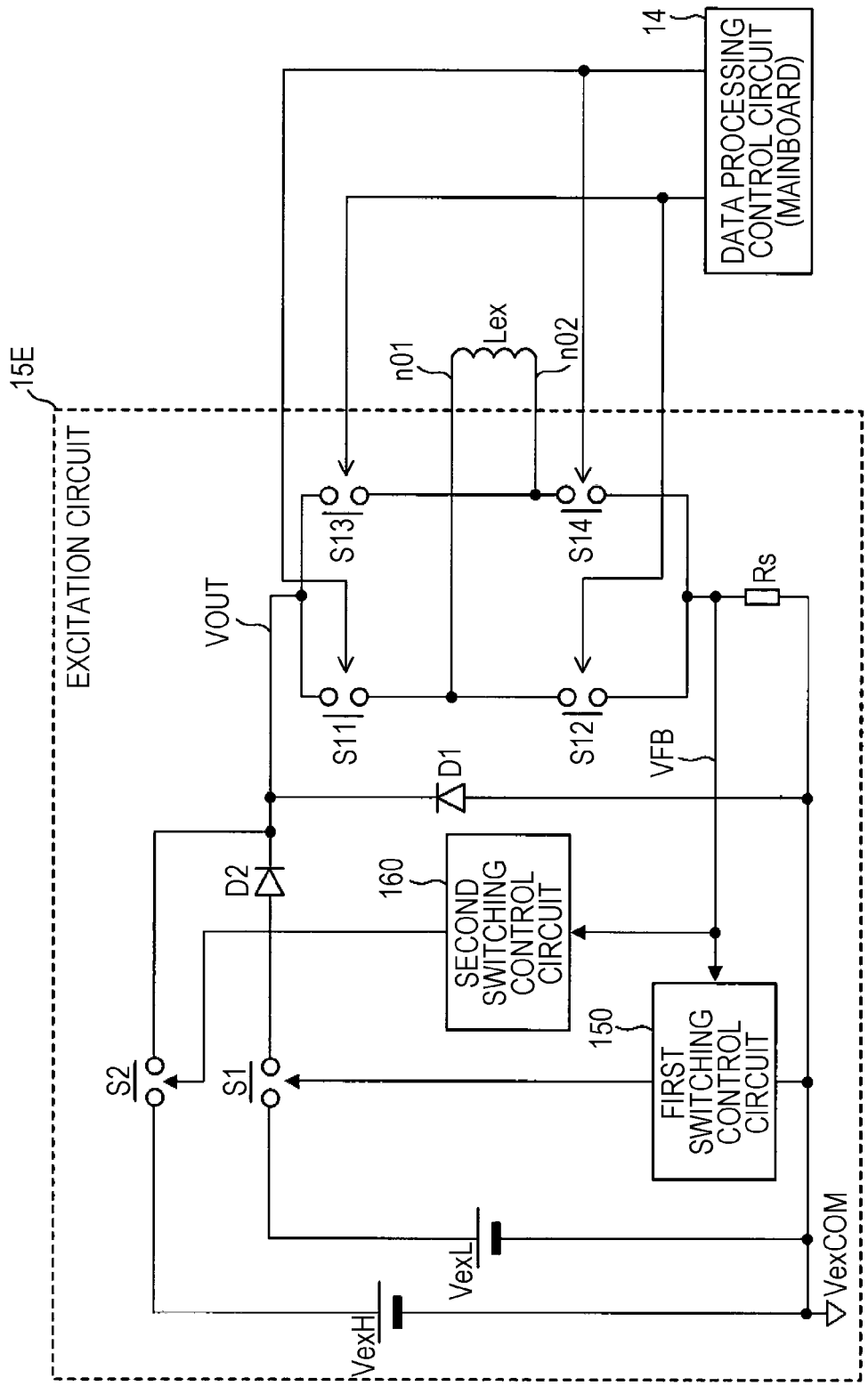
FIG. 14 conceptually illustrates the configuration of an excitation circuit according to another embodiment of the present disclosure.

For example, the embodiments described above provide a circuit configuration in which the diodes D11 to D14, which serve as backflow prevention elements, are connected in series with the low-speed switches S11 to S14, respectively, by way of example but not limitation. For example, if the influence of backflow of current when the high-speed switch S1 is turned off is negligible in terms of measurement stability required for the electromagnetic flow meter, as in an excitation circuit 15E illustrated in FIG. 14, the diodes D11 to D14, which serve backflow prevention elements, may not necessarily be included.

In the fourth and fifth embodiments, the diodes D1a and D1b, instead of the diode D1, are used as current-returning elements, by way of example but not limitation. In addition to the diodes D1a and D1b, the diode D1 may be connected between the signal line VOUT and the signal line VexCOM.

In the embodiments described above, furthermore, the diodes D11 to D14 are used as backflow prevention elements, by way of example but not limitation. Instead of the high-side diodes D11 and D13, high-side switch circuits S11D and S13D, each of which is constituted by transistors MP1 and MP2 illustrated in FIG. 15A, may be used. Instead of the low-side diodes D12 and D14, low-side switch circuits S12D and S14D, each of which is constituted by transistors MN1 and MN2 illustrated in FIG. 15B, may be used.

This configuration prevents the diodes D11 to D14 from generating heat, which enables a further increase in excitation current and enables further improvement in the measurement stability of the electromagnetic flow meter. In addition, an excitation circuit having such a configuration can attain high efficiency as a power supply circuit. Further, this configuration can reduce voltage drop in the diodes D11 to D14, which enables a reduction in the loss of the excitation voltage Vex. Therefore, the excitation circuit can also be applied to a battery-type (battery-driven) electromagnetic flow meter or a two-wire electromagnetic flow meter which would not otherwise be supplied with large voltage as the high voltage VexH and the low voltage VexL (the output voltage VOUT).

Figure 15A:
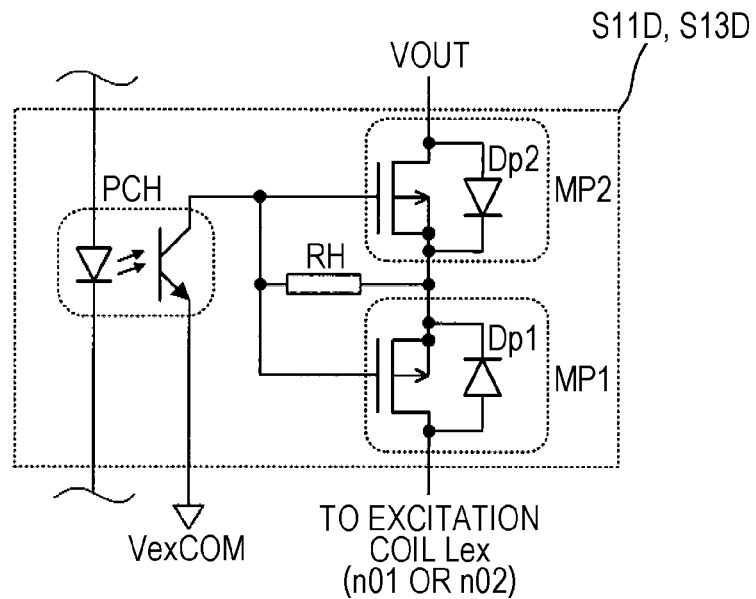
FIG. 15A illustrates the circuit configuration of high-side switch circuits.
Figure 15B:
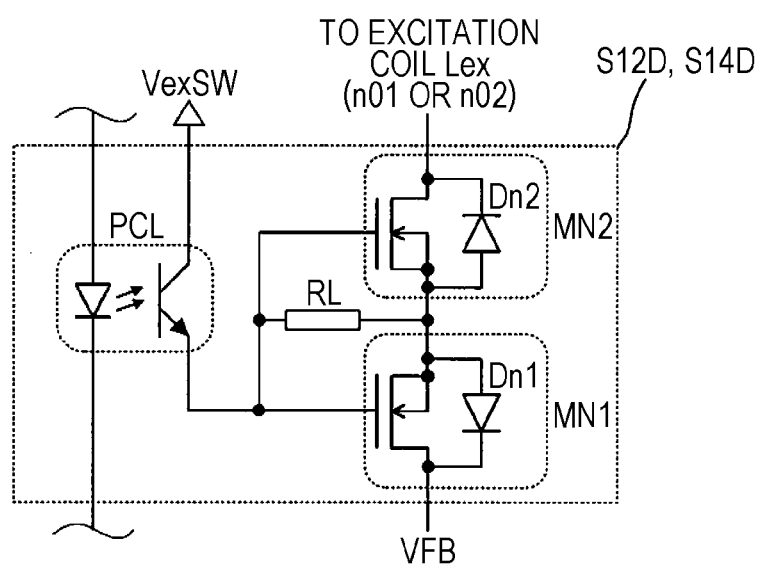
FIG. 15B illustrates the circuit configuration of low-side switch circuits.
Figure 16:
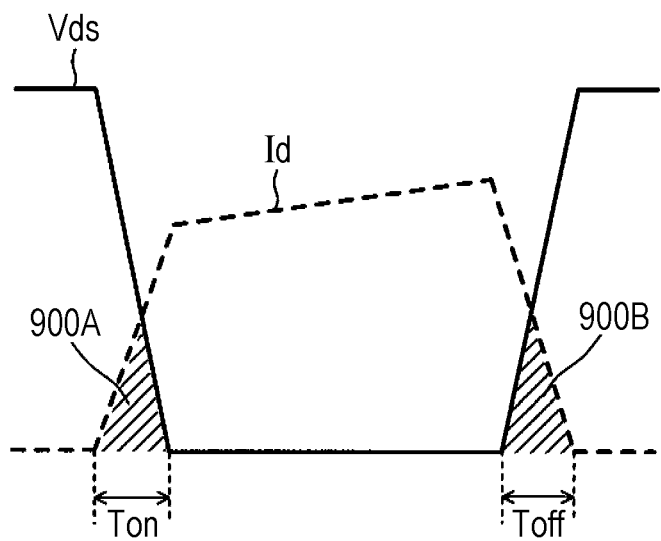
FIG. 16 illustrates switching loss in the excitation circuit disclosed in Patent Literature 3.

In FIG. 15A, P-channel MOS transistors (MP1 and MP2) are used as transistors constituting the high-side switch circuits S11 and S13, by way of example but not limitation. Alternatively, N-channel MOS transistors may be used. In this case, a bootstrap circuit or the like for driving the N-channel MOS transistors is necessary.

In the fourth and fifth embodiments, the switching control circuit 150 that adopts the PWM technique is used, by way of example. Alternatively, the switching control circuit 150B provided in the third embodiment, which adopts the PFM technique, may be used. In the fourth and fifth embodiments, alternatively, the switching control circuit 150A, which limits the maximum duty ratio of a PMW signal, may be used instead of the switching control circuit 150.

In the embodiments described above, furthermore, diodes (such as the diodes D1, D1a, and D1b) are used as rectifier elements, by way of example. Alternatively, transistors or the like may be used instead, whose on and off states may be controlled as appropriate to implement a rectification function.

In the first to third embodiments, the cathode of the diode D1 is connected to the signal line VOUT (the cathode of the diode D2), by way of example. Alternatively, the cathode of the diode D1 may be connected to the anode of the diode D2.

In the foregoing description, the excitation circuits according to the embodiments are each applied to a capacitive-type electromagnetic flow meter, by way of example. Each of the excitation circuits according to the embodiments may also be applied to a contact electromagnetic flow meter.

What is claimed is:

1. An excitation circuit for supplying an excitation current to an excitation coil in an electromagnetic flow meter, the excitation circuit comprising:
   a first line supplied with a first direct-current voltage;
   a second line supplied with a second direct-current voltage higher than the first direct-current voltage;
   a third line;
   a first switch connected between the first line and the third line;
   a second switch connected between the second line and the third line;
   a first power supply backflow prevention element connected in series with the first switch between the first line and the third line, the first power supply backflow prevention element being configured to allow current flow from the first line to the third line and configured to block current flow in a direction opposite to the current flow from the first line to the third line;

a switch circuit that applies a voltage of the third line to the excitation coil as an excitation voltage and that reverses a polarity of the excitation voltage in accordance with intervals at which an excitation polarity of the excitation coil is switched to change a direction of the excitation current;

a current detecting element that detects the excitation current flowing through the excitation coil;

a first switching control circuit that switches between on and off states of the first switch at intervals shorter than the intervals at which the excitation polarity of the excitation coil is switched and that sets the current detected by the current detecting element as a first target value;

a second switching control circuit that turns on the second switch when the current detected by the current detecting element is smaller than a second target value less than or equal to the first target value and that turns off the second switch when the current detected by the current detecting element is larger than the second target value; and at least one current-returning element that allows the excitation current to return via the switch circuit and the excitation coil when the first switch is turned off.

2. The excitation circuit according to claim 1, further comprising:

a fourth line supplied with a third direct-current voltage lower than the second direct-current voltage; and a fifth line, wherein the switch circuit includes
a third switch connected between the third line and a first end of the excitation coil, the third switch being switched in accordance with the intervals at which the excitation polarity of the excitation coil is switched,
a fourth switch connected between the first end of the excitation coil and the fifth line, the fourth switch being switched in opposite phase to the third switch in accordance with the intervals at which the excitation polarity of the excitation coil is switched,
a fifth switch connected between the third line and a second end of the excitation coil, the fifth switch being switched in opposite phase to the third switch in accordance with the intervals at which the excitation polarity of the excitation coil is switched, and
a sixth switch connected between the second end of the excitation coil and the fifth line, the sixth switch being switched in phase with the third switch in accordance with the intervals at which the excitation polarity of the excitation coil is switched, the current detecting element is a resistor connected between the fourth line and the fifth line, the first switching control circuit switches between the on and off states of the first switch such that a voltage across the resistor matches a first reference voltage corresponding to the first target value, and the second switching control circuit turns on the second switch when the voltage across the resistor is lower than a second reference voltage corresponding to the second target value, and turns off the second switch when the voltage across the resistor is higher than the second reference voltage.

3. The excitation circuit according to claim 2, wherein the first switching control circuit outputs a pulse-width-modulation signal having a duty ratio of less than 100% in accordance with a difference between a current flowing through the resistor and the first target value, and performs switching of the first switch.

4. The excitation circuit according to claim 3, wherein the first switching control circuit includes
an error amplifier circuit that generates an error signal corresponding to a difference between the voltage across the resistor and the first reference voltage,
a periodic signal generation circuit that generates a periodic signal,
a comparator that compares the error signal and the periodic signal with each other and that generates the pulse-width-modulation signal based on a comparison result, and
a voltage limiting element that limits a voltage of the error signal.

5. The excitation circuit according to claim 2, wherein the first switching control circuit outputs a pulse-frequency-modulation signal having a frequency that is variable in accordance with a difference between a current flowing through the resistor and the first target value, and performs switching of the first switch.

6. The excitation circuit according to claim 2, further comprising:
a first backflow prevention element connected in series with the third switch between the third line and the first end of the excitation coil, the first backflow prevention element being configured to allow current flow from the third line to the first end of the excitation coil and configured to block current flow in a direction opposite to the current flow from the third line to the first end of the excitation coil;
a second backflow prevention element connected in series with the fourth switch between the first end of the excitation coil and the fifth line, the second backflow prevention element being configured to allow current flow from the first end of the excitation coil to the fifth line and configured to block current flow in a direction opposite to the current flow from the first end of the excitation coil to the fifth line;
a third backflow prevention element connected in series with the fifth switch between the third line and the second end of the excitation coil, the third backflow prevention element being configured to allow current flow from the third line to the second end of the excitation coil and configured to block current flow in a direction opposite to the current flow from the third line to the second end of the excitation coil; and
a fourth backflow prevention element connected in series with the sixth switch between the second end of the excitation coil and the fifth line, the fourth backflow prevention element being configured to allow current flow from the second end of the excitation coil to the fifth line and configured to block current flow in a direction opposite to the current flow from the second end of the excitation coil to the fifth line.

7. The excitation circuit according to claim 2, wherein the current-returning element includes a rectifier element connected between the third line and the fourth line, the rectifier element being configured to allow current flow from the fourth line to the third line and configured to block current flow in a direction opposite to the current flow from the fourth line to the third line.

8. The excitation circuit according to claim 2, wherein the current-returning element includes
a first rectifier element connected between the first end of the excitation coil and the fourth line, the first rectifier element being configured to allow current flow from the fourth line to the first end of the excitation coil and configured to block current flow in a direction opposite to the current flow from the fourth line to the first end of the excitation coil, and a second rectifier element connected between the second end of the excitation coil and the fourth line, the second rectifier element being configured to allow current flow from the fourth line to the second end of the excitation coil and configured to block current flow in a direction opposite to the current flow from the fourth line to the second end of the excitation coil.

9. The excitation circuit according to claim 8, further comprising:

a second power supply backflow prevention element connected between the second line and the second switch, the second power supply backflow prevention element being configured to allow current flow from the second line to the second switch and configured to block current flow in a direction opposite to the current flow from the second line to the second switch;

a sixth line to which the second power supply backflow prevention element and the second switch are connected;

a capacitor connected between the sixth line and the fourth line;

a third rectifier element connected between the sixth line and the first end of the excitation coil, the third rectifier element being configured to allow current flow from the first end of the excitation coil to the sixth line and configured to block current flow in a direction opposite to the current flow from the first end of the excitation coil to the sixth line; and a fourth rectifier element connected between the sixth line and the second end of the excitation coil, the fourth rectifier element being configured to allow current flow from the second end of the excitation coil to the sixth line and configured to block current flow in a direction opposite to the current flow from the second end of the excitation coil to the sixth line.

10. The excitation circuit according to claim 1, wherein the first switching control circuit comprises a single semiconductor integrated circuit.

11. An electromagnetic flow meter comprising:

a measuring pipe in which a fluid to be measured flows;

the excitation circuit according to claim 1;

the excitation coil, the excitation coil being external to the measuring pipe;

a pair of electrodes attached to the measuring pipe, the pair of electrodes facing each other in a direction perpendicular to a magnetic field generated from the excitation coil; and a data processing control circuit that calculates a flow rate of the fluid based on an electromotive force generated between the pair of electrodes.

12. The electromagnetic flow meter according to claim 11, wherein the pair of electrodes are disposed in non-contact with the fluid in the measuring pipe.

* * * * *